US011327958B2

(12) United States Patent
Lee et al.

(10) Patent No.: US 11,327,958 B2
(45) Date of Patent: *May 10, 2022

(54) TABLE REPLICATION IN A DATABASE ENVIRONMENT

(71) Applicant: SAP SE, Walldorf (DE)

(72) Inventors: Juchang Lee, Seoul (KR); Chang Gyoo Park, Seoul (KR); Kyu Hwan Kim, Seoul (KR); Hyoung Jun Na, Seoul (KR); Deok Koo Kim, Seoul (KR); Joo Yeon Lee, Seoul (KR)

(73) Assignee: SAP SE, Walldorf (DE)

( * ) Notice: Subject to any disclaimer, the term of this patent is extended or adjusted under 35 U.S.C. 154(b) by 76 days.

This patent is subject to a terminal disclaimer.

(21) Appl. No.: 17/005,085

(22) Filed: Aug. 27, 2020

(65) Prior Publication Data

US 2020/0394182 A1     Dec. 17, 2020

Related U.S. Application Data

(63) Continuation of application No. 14/975,365, filed on Dec. 18, 2015, now Pat. No. 10,795,881.

(51) Int. Cl.
*G06F 16/00* (2019.01)
*G06F 16/23* (2019.01)
(Continued)

(52) U.S. Cl.
CPC ...... *G06F 16/2379* (2019.01); *G06F 11/1451* (2013.01); *G06F 16/273* (2019.01); *G06F 16/275* (2019.01); *G06F 2201/80* (2013.01)

(58) Field of Classification Search
CPC .......... G06F 11/1451; G06F 17/30377; G06F 17/30578; G06F 17/30581; G06F 2201/80
See application file for complete search history.

(56) References Cited

U.S. PATENT DOCUMENTS 5,452,445 A * 9/1995 Hallmark ............ G06F 16/2379
6,205,449 B1    3/2001 Rastogi et al.
(Continued)

FOREIGN PATENT DOCUMENTS

EP    2653986    10/2013
EP    2685698    1/2014
(Continued)

OTHER PUBLICATIONS

Binnig, C. et al., "Distributed Snapshot Isolation: Global Transactions Pay Globally, Local Transactions Pay Locally", VLDB J. 23(6): 987-1011 (2014).

(Continued)

*Primary Examiner* — Shew Fen Lin
(74) *Attorney, Agent, or Firm* — Klarquist Sparkman, LLP

(57) ABSTRACT

Technologies are described for performing replication of data within a database environment having a source node and a replica node. The source node executes a database operation on at least one database table stored by the source node. The source node asynchronously sends the database operation to the replica node. A prepare commit request is synchronously sent from the source node to the replica node. The source node receives a synchronous precommit acknowledgement from the replica node. The precommit acknowledgement indicates that the database operation was executed at the replica node. The source node commits a transaction associated with the database operation.

26 Claims, 18 Drawing Sheets

(51) Int. Cl.
*G06F 16/27* (2019.01)
*G06F 11/14* (2006.01)

(56) References Cited

U.S. PATENT DOCUMENTS

| | | | |
|---|---|---|---|
| 6,662,196 B2* | 12/2003 | Holenstein | G06F 16/275 |
| 7,290,056 B1 | 10/2007 | McLaughlin, Jr. | |
| 7,305,421 B2 | 12/2007 | Cha et al. | |
| 7,693,885 B2 | 4/2010 | Okada et al. | |
| 8,332,354 B1 | 12/2012 | Chatterjee et al. | |
| 8,385,314 B1 | 2/2013 | Sigg et al. | |
| 8,442,962 B2 | 5/2013 | Lee et al. | |
| 8,700,660 B2 | 4/2014 | Lee et al. | |
| 8,768,927 B2 | 7/2014 | Yoon et al. | |
| 8,782,100 B2 | 7/2014 | Yoon et al. | |
| 8,793,276 B2 | 7/2014 | Lee et al. | |
| 8,903,779 B1* | 12/2014 | Holenstein | G06F 11/1469 |
| | | | 707/685 |
| 8,918,436 B2 | 12/2014 | Yoon et al. | |
| 8,935,205 B2 | 1/2015 | Hildenbrand et al. | |
| 9,009,182 B2 | 4/2015 | Renkes et al. | |
| 9,037,677 B2 | 5/2015 | Lee et al. | |
| 9,063,969 B2 | 6/2015 | Lee et al. | |
| 9,098,522 B2 | 8/2015 | Lee et al. | |
| 9,519,555 B2* | 12/2016 | Calder | G06F 16/275 |
| 9,569,473 B1 | 2/2017 | Holenstein et al. | |
| 9,779,220 B1 | 10/2017 | Kronrod et al. | |
| 9,830,223 B1 | 11/2017 | Holenstein et al. | |
| 10,235,440 B2 | 3/2019 | Lee et al. | |
| 10,498,625 B1 | 12/2019 | Mozealous et al. | |
| 10,572,510 B2 | 2/2020 | Lee et al. | |
| 10,795,881 B2 | 10/2020 | Lee et al. | |
| 10,977,227 B2 | 4/2021 | Lee et al. | |
| 2002/0194206 A1* | 12/2002 | Ganesh | G06F 16/2474 |
| 2003/0061537 A1 | 3/2003 | Cha et al. | |
| 2004/0133591 A1 | 7/2004 | Holenstein et al. | |
| 2004/0148289 A1* | 7/2004 | Bamford | G06F 16/2379 |
| 2004/0255048 A1 | 12/2004 | Lev Ran et al. | |
| 2008/0065670 A1 | 5/2008 | Cha et al. | |
| 2008/0163062 A1 | 7/2008 | Lee et al. | |
| 2009/0024851 A1 | 1/2009 | Andrade | |
| 2009/0172201 A1 | 7/2009 | Carmel | |
| 2009/0292744 A1* | 11/2009 | Matsumura | G06F 9/466 |
| 2009/0313311 A1* | 12/2009 | Hoffmann | G06F 11/2097 |
| 2011/0225121 A1 | 9/2011 | Cooper | |
| 2012/0054533 A1* | 3/2012 | Shi | G06F 11/2097 |
| | | | 714/4.1 |
| 2012/0084273 A1 | 4/2012 | Lee et al. | |
| 2012/0084274 A1 | 4/2012 | Renkes et al. | |
| 2012/0102006 A1 | 4/2012 | Larson et al. | |
| 2012/0105424 A1 | 5/2012 | Lee et al. | |
| 2012/0166407 A1 | 6/2012 | Lee et al. | |
| 2012/0167098 A1 | 6/2012 | Lee et al. | |
| 2012/0173589 A1 | 7/2012 | Kwon et al. | |
| 2012/0303576 A1* | 11/2012 | Calder | G06F 16/275 |
| | | | 707/611 |
| 2012/0323849 A1* | 12/2012 | Garin, Jr. | G06F 16/27 |
| | | | 707/617 |
| 2013/0117307 A1 | 5/2013 | Vishnoi et al. | |
| 2013/0124475 A1 | 5/2013 | Hildenbrand et al. | |
| 2013/0151494 A1 | 6/2013 | Dhamankar et al. | |
| 2013/0166534 A1 | 6/2013 | Yoon et al. | |
| 2013/0166553 A1 | 6/2013 | Yoon et al. | |
| 2013/0166554 A1 | 6/2013 | Yoon et al. | |
| 2013/0235000 A1 | 9/2013 | Lee et al. | |
| 2013/0275457 A1 | 10/2013 | Lee et al. | |
| 2013/0275467 A1 | 10/2013 | Lee et al. | |
| 2013/0275468 A1 | 10/2013 | Lee et al. | |
| 2013/0275550 A1 | 10/2013 | Lee et al. | |
| 2013/0290282 A1 | 10/2013 | Faerber et al. | |
| 2013/0304714 A1* | 11/2013 | Lee | G06F 9/466 |
| | | | 707/703 |
| 2014/0122439 A1 | 5/2014 | Faerber et al. | |
| 2014/0122452 A1 | 5/2014 | Faerber et al. | |
| 2014/0136473 A1 | 5/2014 | Faerber et al. | |
| 2014/0136788 A1 | 5/2014 | Faerber et al. | |
| 2014/0149353 A1 | 5/2014 | Lee et al. | |
| 2014/0149368 A1 | 5/2014 | Lee et al. | |
| 2014/0149527 A1 | 5/2014 | Lee et al. | |
| 2014/0156619 A1 | 6/2014 | Lee et al. | |
| 2014/0222418 A1 | 8/2014 | Richtarsky et al. | |
| 2014/0244628 A1 | 8/2014 | Yoon et al. | |
| 2014/0297686 A1 | 10/2014 | Lee et al. | |
| 2014/0304219 A1 | 10/2014 | Yoon et al. | |
| 2014/0334582 A1 | 11/2014 | Bock et al. | |
| 2014/0337393 A1 | 11/2014 | Burchall et al. | |
| 2014/0379658 A1 | 12/2014 | Cheriton | |
| 2015/0074082 A1 | 5/2015 | Yoon et al. | |
| 2015/0149409 A1 | 5/2015 | Lee et al. | |
| 2015/0149413 A1 | 5/2015 | Lee et al. | |
| 2015/0149426 A1 | 5/2015 | Kim et al. | |
| 2015/0149704 A1 | 5/2015 | Lee et al. | |
| 2015/0149736 A1 | 5/2015 | Kwon et al. | |
| 2015/0178343 A1 | 6/2015 | Renkes et al. | |
| 2015/0242400 A1 | 8/2015 | Bensberg et al. | |
| 2015/0242451 A1 | 8/2015 | Bensberg et al. | |
| 2015/0254273 A1 | 9/2015 | Larson et al. | |
| 2015/0261805 A1 | 9/2015 | Lee et al. | |
| 2015/0278282 A1* | 10/2015 | Sardina | G06F 16/2343 |
| | | | 707/704 |
| 2016/0262684 A1 | 9/2016 | Cacioppo et al. | |
| 2016/0371356 A1 | 12/2016 | Lee et al. | |
| 2020/0034373 A1 | 1/2020 | Lee et al. | |

FOREIGN PATENT DOCUMENTS

| | | |
|---|---|---|
| EP | 2738695 | 6/2014 |
| WO | WO 2016/045548 | 3/2016 |

OTHER PUBLICATIONS

Cha et al., "An Extensible Architecture for Main-Memory Real-Time Storage Systems", RTCSA : 67-73 (1996).
Cha et al., "An Object-Oriented Model for FMS Control", J. Intelligent Manufacturing 7(5): 387-391 (1996).
Cha et al., "Cache-Conscious Concurrency Control of Main-Memory Indexes on Shared-Memory Multiprocessor Systems", VLDB: 181-190 (2001).
Cha et al., "Efficient Web-Based Access to Multiple Geographic Databases Through Automatically Generated Wrappers", WISE : 34-41 (2000).
Cha et al., "Interval Disaggregate: A New Operator for Business Planning", PVLDB 7(13): 1381-1392 (2014).
Cha et al., "Kaleidoscope: A Cooperative Menu-Guided Query Interface", SIGMOD Conference : 387 (1990).
Cha et al., "Kaleidoscope Data Model for An English-like Query Language", VLDB : 351-361 (1991).
Cha et al., "MEADOW: A Middleware for Efficient Access to Multiple Geographic Databases Through OpenGIS Wrappers", Softw., Pract. Exper. 32(4): 377-402 (2002).
Cha et al., "Object-Oriented Design of Main-Memory DBMS for Real-Time Applications", RTCSA : 109-115 (1995).
Cha et al., "Paradigm Shift to New DBMS Architectures: Research Issues and Market Needs", ICDE: 1140 (2005).
Cha et al., "P*TIME: Highly Scalable OLTP DBMS for Managing Update-Intensive Stream Workload", VLDB: 1033-1044 (2004).
Cha et al., "Xmas: An Extensible Main-Memory Storage System", CIKM : 356-362 (1997).
Farber et al., SAP HANA Database: Data Management for Modern Business Applications. SIGMOD Record 40(4): 45-51 (2011).
Hwang et al., "Performance Evaluation of Main-Memory R-tree Variants", SSTD: 10-27 (2003).
Kim et al., "Optimizing Multidimensional Index Trees for Main Memory Access", SIGMOD Conference: 139-150 (2001).
Lee et al., "A Performance Anomaly Detection and Analysis Framework for DBMS Development", IEEE Trans. Knowl. Data Eng. 24(8): 1345-1360 (2012).
Lee et al., "Differential Logging: A Commutative and Associative Logging Scheme for Highly Parallel Main Memory Databases", ICDE 173-182 (2001).

(56) References Cited

OTHER PUBLICATIONS

Lee et al., "High-Performance Transaction Processing in SAP HANA", IEEE Data Eng. Bull. 36(2): 28-33 (2013).
Lee et al., "SAP HANA Distributed In-Memory Database System: Transaction, Session, and Metadata Management", ICDE 1165-1173 (2013).
Park et al., Xmas: An Extensible Main-Memory Storage System for High-Performance Applications. SIGMOD Conference : 578-580 (1998).
Sikka et al., "Efficient Transaction Processing in SAP HANA Database: The End of a Column Store Myth", SIGMOD Conference : 731-742 (2012).
Yoo et al., "A Middleware Implementation of Active Rules for ODBMS", DASFAA : 347-354 (1999).
Yoo et al., "Integrity Maintenance in a Heterogeneous Engineering Database Environment", Data Knowl. Eng. 21(3): 347-363 (1997).
Extended European Search Report, dated Apr. 4, 2017, EPC Appl. No. 16002568.0, 17 pages.
Extended European Search Report, dated Apr. 5, 2017, EPC App. No. 16002546.6 (10 pages).
Kemme, et al., "Database Replication: A Tutorial," *Replication, LNCS*, 5959: 219-252, 2010.
Wiesmann, et al., "Understanding replication in databases and distributed systems," *Distributed Computing Systems*, pp. 464-474, 2000.
Aulbach et al., "Extensibility and Data Sharing in Evolving Multi-Tenant Databases," in 2011 IEEE 27th International Conference on Data Engineering. IEEE, pp. 99-110 (2011).
Bailis et al., "Hat, Not Cap: Towards Highly Available Transactions", in Proceedings of the 14th USENIX Conference on Hot Topics in Operating Systems, pp. 24, USENIX Association (2013).
Bailis et al., "Scalable Atomic Visibility with Ramp Transactions," in Proceedings of the 2014 ACM SIGMOD International Conference on Management of Data. ACM, pp. 27-38 (2014).
Barber et al., "In-Memory Blu Acceleration in IBM's db2 and dashdb: Optimized for Modern Workloads and Hardware Architectures," in Proceedings of the 2015 International Conference on Data Engineering (ICDE). IEEE (2015).
Berenson et al., "A Critique of Ansi SQL Isolation Levels," ACM SIGMOD Record, vol. 24, No. 2, pp. 1-10, (1995).
Bernstein et al., "Concurrency Control and Recovery in Database Systems," (1987).
Chang et al., "Bigtable: A Distributed Storage System for Structured Data," ACM Transactions on Computer Systems (TOCS), vol. 26, No. 2, p. 4, (2008).
Chaudhuri et al., "An Overview of Data Warehousing and OLAP Technology," ACM Sigmod Record, vol. 26, No. 1, pp. 65-74 (1997).
Cooper et al., "Pnuts: Yahoo!'s Hosted Data Serving Platform," Proceedings of the VLDB Endowment, vol. 1, No. 2, pp. 1277-1288 (2008).
DeCandia et al., "Dynamo: Amazon's Highly Available Key-Value Store," ACM SIGOPS Operating Systems Review, vol. 41, No. 6, pp. 205-220 (2007).
DeWitt et al., "Parallel Database Systems: the Future of High Performance Database Systems," Communications of the ACM, vol. 35, No. 6, pp. 85-98 (1992).
Diaconu et al., "Hekaton: SQL Server's Memory-Optimized OLTP Engine," in Proceedings of the 2013 ACM SIGMOD International Conference on Management of Data. ACM, pp. 1243-1254 (2013).
Du et al., "Clock-Si: Snapshot Isolation for Partitioned Data Stores Using Loosely Synchronized Clocks," in Reliable Distributed Systems (SRDS), 2013 IEEE 32nd International Symposium on. IEEE, pp. 173-184 (2013).
Fekete et al., "Making Snapshot Isolation Serializable," ACM Transactions on Database Systems (TODS), vol. 30, No. 2, pp. 492-528 (2005).
Kallman et al., "Hstore: A High-Performance, Distributed Main Memory Transaction Processing System," Proceedings of the VLDB Endowment, vol. 1, No. 2, pp. 1496-1499 (2008).

Kemper et al., "Hyper: A Hybrid OLTP & OLAP Main Memory Database System Based on Virtual Memory Snapshots," in Data Engineering (ICDE), 2011 IEEE 27th International Conference on. IEEE, pp. 195-206 (2011).
Kung et al., "On Optimistic Methods for Concurrency Control," ACM Transactions on Database Systems (TODS), vol. 6, No. 2, pp. 213-226 (1981).
Lahiri et al., "Cache Fusion: Extending Shared-Disk Clusters with Shared Caches," in VLDB, vol. 1, pp. 683-686 (2001).
Lahiri et al., "Oracle Timesten: An In-Memory Database for Enterprise Applications." IEEE Data Eng. Bull., vol. 36, No. 2, pp. 6-13 (2013).
Larson et al., "High-Performance Concurrency Control Mechanisms for Main-Memory Databases," Proceedings of the VLDB Endowment, vol. 5, No. 4, pp. 298-309, (2011).
Neumann et al., "Fast Serializable Multi-Version Concurrency Control for Main-Memory Database Systems," in Proceedings of the 2015 ACM SIGMOD International Conference on Management of Data. ACM, pp. 677-689 (2015).
Pandis et al., "Dataoriented Transaction Execution," Proceedings of the VLDB Endowment, vol. 3, No. 1-2, pp. 928-939 (2010).
Plattner, H., "A Common Database Approach for OLTP and OLAP Using an In-Memory Column Database", in Proceedings of the 2009 ACM SIGMOD International Conference on Management of Data, pp. 1-2. ACM (2009).
Qiao et al., "On Brewing Fresh Espresso: Linkedin's Distributed Data Serving Platform," in Proceedings of the 2013 ACM SIGMOD International Conference on Management of Data. ACM, pp. 1135-1146 (2013).
Roy et al., "The Homeostasis Protocol: Avoiding Transaction Coordination Through Program Analysis," in Proceedings of the 2015 ACM SIGMOD International Conference on Management of Data. ACM, pp. 1311-1326 (2015).
"SAP HANA SQL and System Views Reference," retrieved from https://help.sap.com/viewer/4fe29514fd584807ac9f2a04f6754767/2.0.00/en-.
Tu et al., "Speedy Transactions in Multicore In-Memory Databases," in Proceedings of the Twenty-Fourth ACM Symposium on Operating Systems Principles. ACM, pp. 18 32 (2013).
Vogels, W., "Eventually Consistent," Communications of the ACM, vol. 52, No. 1, pp. 40-44 (2009).
Weikum et al., "Transactional Information Systems: Theory, Algorithms, and the Practice of Concurrency Control and Recovery," (2001).
Zamanian et al., "Locality-Aware Partitioning in Parallel Database Systems," in Proceedings of the 2015 ACM SIGMOD International Conference on Management of Data. ACM, pp. 17-30 (2015).
"HINT Details," HINT Details—SAP HANA SQL and System Views Reference—SAP Library, retrieved from http://help-legacy.sap.com, on May 24, 2017, 11 pages.
"SAP HANA SQL and System Views Reference," retrieved from https://help.sap.com/doc/PRODUCTION/9b40bf74f8644b898fb07dabdd2a36ad/2.0.00/en-US/SAP_HANA_SQL_and_System_Views_Reference_en, on May 24, 2017, 1,732 pages.
Daudjee, K., et al. "Lazy Database Replication with Ordering Guarantees" Proceedings of the 20th International Conference on Data Engineering (2004), 12 pp.
European Communication under Rule 71(3) EPC (Intention to grant), dated Mar. 16, 2018, EPC App. No. 16002568.0, 104 pages.
Extended European Search Report, dated Sep. 6, 2018, European Application No. 18175767.5, 11 pages.
Le, "Main Difference between 2PC and 3PC Protocols," https://www.linkedin.com/pulse/main-difference-between-2pc-3pc-protocols-thiensi-le, downloaded Oct. 8, 2018, 4 pages.
Examination Report received in European Patent Application No. 16002546.6 dated Nov. 29, 2018, 7 pages.
Office Action received in EP Application No. 18 175 767.5-1217, dated Sep. 6, 2019, 6 pages.
Notice of Allowance mailed in U.S. Appl. No. 14/977,372, dated Sep. 6, 2019, 11 pages.
Binning et al., "Distributed snapshot isolation: global transactions pay globally, local transactions pay locally," Nov. 9, 2015, pp. 1-30.

(56) References Cited

OTHER PUBLICATIONS

"Research Gate—Distributed snapshot isoloation: global transactions pay locally, local transactions pay locally," retrieved from: https://www.researchgate.net/publication/271923603_Distrubuted snapshot_isolation_global_globally_local_transactions_pay_locally, Nov. 9, 2015, pp. 1-37.

Non-Final Office Action mailed in related U.S. Appl. No. 14/975,365, dated May 15, 2019 (23 pages).

Final Office Action issued in U.S. Appl. No. 14/975,365, dated Sep. 9, 2019, 22 pages.

Non-Final Office Action mailed in related U.S. Appl. No. 14/975,365, dated Feb. 21, 2020 (24 pages).

Office action received in U.S. Appl. No. 15/615,196, dated May 29, 2020, 53 pages.

Notice of Allowance received in U.S. Appl. No. 15/615,196, dated Dec. 9, 2020, 9 pages.

Office Action received in U.S. Appl. No. 16/595,505, filed Oct. 20, 2021, 23 pages.

\* cited by examiner

TABLE REPLICATION IN A DATABASE ENVIRONMENT

CROSS REFERENCE TO RELATED APPLICATION

This application is a continuation of U.S. patent application Ser. No. 14/975,365, filed on Dec. 18, 2015, which is hereby incorporated herein by reference.

FIELD

The present disclosure generally relates to the replication of information. Particular implementations relate to replication of data between a source and a replica in a database environment.

BACKGROUND

Database performance can be enhanced by creating a replica of a source table. For example, the replicated table may be hosted on a different computing system than the source table, with the source and replica hosts having different processors. Having replicas available to service database read requests can help balance computing loads among multiple processors, improving system performance. In some cases, replicas can also be used for "high-availability data" purposes, such as when the replica is able to take over one or more functions of the source table if the source table becomes unavailable.

Challenges in replicated systems include maintaining consistency between the source table and the replica table. Replication can also result in reduced system performance if the overhead associated with replication is too high. For example, in typical synchronous replication protocols, the replica is updated within the same transaction boundary as the source. However, this can result in delayed transaction visibility at both the source and replica hosts, as synchronous replication typically involves multiple communications between the computing system hosting the source table and the computing system hosting the replica table.

In some cases, performance can be improved by asynchronously replicating changes to the replica table. However, fully asynchronous protocols can add additional complexity to the database system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for performing replication (e.g., replication of database information as modified by insert, update, and/or delete database operations), such as using data manipulation language (DML) statements, within a database environment. The database environment includes a source node and a replica node.

In one aspect, the source node executes a database operation on at least one database table stored by the source node. The source node asynchronously sends the database operation to the replica node. A prepare commit request is synchronously sent from the source node to the replica node. The source node receives a synchronous precommit acknowledgement from the replica node. The precommit acknowledgement indicates that the database operation was executed at the replica node. The source node commits a transaction associated with the database operation. In some implementations, the committing the transaction at the source node can begin (such as writing a commit log) without waiting to receive the synchronous precommit acknowledgement from the replica node.

In another aspect, in the database environment, the replica node receives a database operation sent asynchronously from the source node. The replica node executes the database operation on a copy of at least one database table stored by the replica node, and replicated from a table at the source node. A synchronous notification is received by the replica node from the source node to prepare to commit a transaction that includes the database operation. The replica node precommits the transaction and sends a synchronous prepare commit acknowledgment to the source node. The prepare commit acknowledgment indicates that the transaction was precommitted by the replica node.

In yet another aspect, in the database environment, the source node executes a database operation on at least one database table stored by the source node. The source node sends the database operation to the replica node. A synchronous prepare commit request is sent from the source node to the replica node. The source node receives a synchronous prepare commit acknowledgement from the replica node, which indicates that a transaction associated with the database operation was precommitted by the replica node. The source node commits the transaction. In some implementations, the committing the transaction at the source node may begin (such as writing a commit log) without waiting to receive the synchronous prepare commit acknowledgement from the replica node. Without waiting to receive a commit acknowledgment from the replica node, the source node sends a commit acknowledgment to a database client. The commit acknowledgment (sent from the source node to the database client) indicates that the transaction was committed by the source node.

As described herein, a variety of other features and advantages can be incorporated into the technologies as desired.

DETAILED DESCRIPTION

Example 1—Overview

Figure 1:
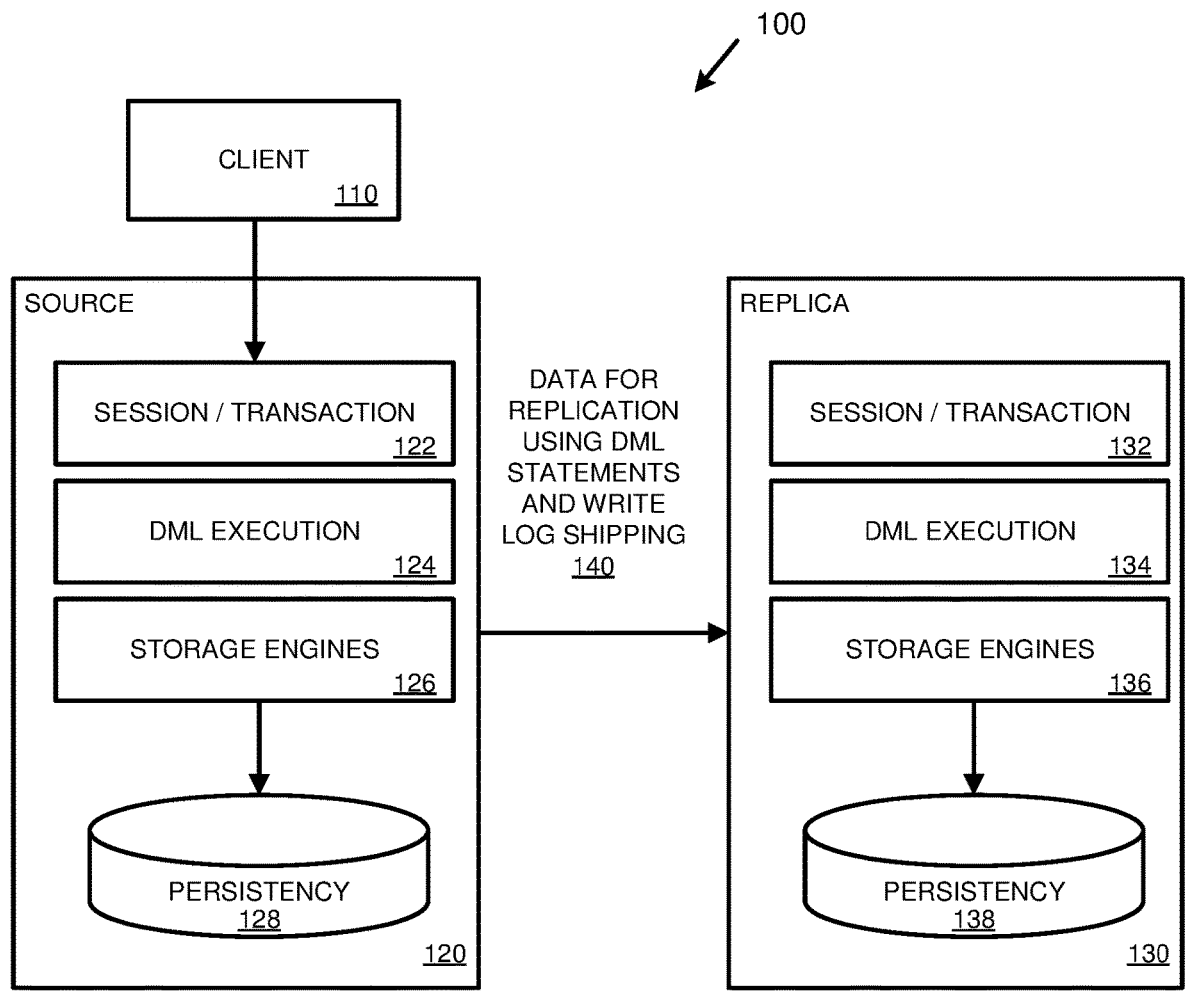
FIG. 1 is a diagram of an environment supporting replication using DML statements and write log shipping.

The following description is directed to techniques and solutions for performing replication of data (e.g., database data). For example, efficient replication of database data can be performed using data manipulation (DML) statements and write log shipping. As used herein, a DML statement refers to any statement, command, message, or other instruction that specifies any manipulation (e.g., insert, update, delete, select) of data. In some implementations, DML statements are executed (e.g., at a first database system) and write logs are created reflecting the DML statements and transaction commit operations. In one example, a separate write log entry is created for each DML statement or transaction commit operation. In a specific example, a write log entry can include a DML statement and associated parameters and/or values (e.g., parameters and/or values that may be needed when the DML statement is executed at another database system). The write logs entries can be inserted into a write log queue and sent to one or more other database systems for execution. In this way, database data can be replicated between a first database system (e.g., a source host or a source system distributed among multiple source nodes) and one or more other database systems (e.g., a replica system having a replica host or being replicated among multiple replica nodes).

As used herein, a source system refers to a database system (e.g., one or more computing devices implementing a database environment) from which database information (e.g., one or more database tables, an entire database, or other selection of database information) is replicated to other systems. The term database table indicates any portion of a database, however organized. A host refers to a computing system having a processor and memory. In some cases, a source system can include multiple hosts, typically referred to as nodes. However, unless the context clearly indicates otherwise, a node can refer to the host in a single host system, or one of a plurality of hosts in a system. A master node refers to a source node that manages information regarding the master node and one or more slave nodes. A slave node refers to a source node that is installed on a different host than the master source node.

Tables (e.g., database tables) can be replicated to multiple nodes (e.g., database nodes) in a scale-out system. This feature can provide scalable search or query throughput by leveraging multiple cores in multiple nodes beyond the limitation of a single machine. It can also reduce network traffic for joins performed on multiple tables, when those tables are replicated on multiple nodes, by providing more localized access. In a specific example, data replication can improve performance of a database system for both online analytical processing (OLAP) queries and operations and online transaction processing (OLTP) transactions and queries.

However, a performance penalty can occur when DML statements are replicated in a synchronous manner (e.g., when a DML statement is executed on a source system and a replica system within the same transaction boundary, where execution on all nodes must complete before the transaction is committed). In some cases, the penalty can be reduced, which achieves the benefits of scale-out, through asynchronous replication. In some implementations of asynchronous replication, a transaction is committed when the DML statements in the transaction are committed at the source system, and the changes are propagated to the replica system outside the transaction boundary.

As used herein, a replica system refers to a database system that replicates database information (e.g., replicates one or more database tables, an entire database, or other selection of database information) from a source system, such as a single source host or a source system distributed among multiple source nodes. In some examples, the replica system may include a single replica host. In other examples, the replica system includes a plurality of replica nodes, which may store multiple copies of database tables maintained at the source system, have source database tables distributed across a plurality of replica nodes, or combinations thereof. In yet further examples, a single table may be distributed among multiple source nodes and/or may be distributed among multiple replica nodes.

The data at different database nodes in a distributed database system (such as a database system that includes more than one replica node, more than one source node, or more than one source node and more than one replica node) can be a database table that is partitioned (that is, divided, split) between database nodes. The database table can be partitioned between rows (different rows in different partitions) and/or between columns (different columns in different partitions). The database nodes of a distributed database system can contain one or more partitions (parts) of partitioned tables. Alternatively, the partitioned data is organized in some other way. Unless indicated otherwise, a database table can refer to a partition of a database table. In further examples, the table is not partitioned.

When partitioned, a database table may be split among multiple source nodes and replicated to multiple replica nodes. In some cases, the partitioning is the same between the source nodes and the replica nodes, while in other cases it is different. In other implementations, the table may be partitioned at the source nodes, but replicated to a single, non-partitioned, replica table at a single replica node. In yet further examples, a table that is not partitioned at a source node may be partitioned and distributed to multiple replica nodes.

Example 2—Write Logs

In any of the examples herein, DML statements (e.g., DML structured query language (SQL) statements) can be replicated using write logs. For example, a write log format can be created that comprises a DML statement with additional information associated with the DML statement (e.g., additional information for use when the DML statement is executed). In some implementations, a write log entry comprises a single DML statement.

In some implementations, a write log entry comprises a transaction identifier (ID), a DML statement, parameter values, and nondeterministic values. The transaction identifier identifies (e.g., uniquely identifies) the DML replication transaction. For example, the transaction identifier can uniquely identify the DML replication transaction that occurs on the source system and one or more replica nodes where the DML statement will be executed.

The DML statement can be a statement used to modify (e.g., add, update, and/or delete) data. For example, the DML statement can be a SQL statement used to modify data in a database. In some implementations, the DML statement is a SQL insert, update, or delete statement (e.g., a single SQL insert, update, or delete statement).

Parameter values are values used by the DML statement. For example, the parameter values can be values for binding to variables in the DML statement (e.g., a prepared or precompiled DML SQL statement). When the DML statement is executed (e.g., replayed), bind variables can be replaced with their corresponding parameter values. For example, if a DML statement contains a variable "NAME", the variable can be replaced with a specific string value when the DML statement is executed (e.g., the variable "NAME" can be replaced with a specific value, such as "John").

Nondeterministic values refer to values that may be different between different computing devices (e.g., different between source nodes and replica nodes). For example, a timestamp function will return a current timestamp value when run on the source system, which may be a different timestamp value when run at a later time on the replica system. In implementations where the same value is to be used for such nondeterministic functions, the nondeterministic function can be evaluated once (e.g., on the source system) and the resulting value can be provided in the logical log to the replica system so that when the DML statement is executed on the replica system the same value will be used (the same value that was used at the source system). For example, the nondeterministic function (e.g., current timestamp function) can be evaluated at the source system during DML statement execution and the resulting value can be sent in a write log entry to the replica system for use when executing the DML statement at the replica system.

In some implementations, a write log entry is the set of shipped values to perform replication of data at a replica location (e.g., a replica node) using a DML statement. In a specific implementation, the write log entry consists of:

Transaction ID
DML SQL statement
Parameter values: values of bind variables (labeled '?') in prepared statement
Nondeterministic values: If the SQL statement includes nondeterministic functions, such as sequence or CURRENT_TIMESTAMP function, evaluated values of the nondeterministic functions may be included As used herein, the terms "ship" or "send" to a destination entity refer to any way of transmitting or otherwise conveying data within a computer system or between two computer systems, whether the data is directly conveyed or conveyed through one or more intermediate entities. Similarly, the term "receive," such as to receive from a source entity, refers to the receipt of data within a computer system or between two computer systems, whether the data is received directly from the computer system of original transmission or received through one or more intermediate entities.

As described above, write log entries can include information regarding other features of a database transaction. In one aspect, the write log includes entries for when a transaction is committed by the source system. For example, a transaction may include multiple DML statements. In one implementation, the transaction is committed after all of the DML statements in the transaction have been executed on the source system. The write log may include additional entries, such as regarding individual DML statements within the transaction having been precommitted on the source system.

Example 3—Environment Providing Replication Using DML Statements

In any of the examples herein, technologies can be provided for more efficient replication (e.g., replication of database information) using DML statements and write logs. For example, DML statements can be executed at a source system and incorporated into write logs for sending (shipping) to a replica system for execution to replicate data between the source system and the replica system for one or more database tables. Additionally, DML replication can be applied to different types of storage engines, such as row stores, column stores, etc.

In some implementations, the concept of DML replication (e.g., DML synchronous replication) with write log shipping is intended to perform replication across multiple nodes with minimum replication overhead. However, synchronous replication can result in longer response times, as both the source and replica(s) are updated in the same transaction boundary. Asynchronous replication, where the replica is not necessarily updated in the same transaction boundary, can allow for the use of a replica system while improving the response time for write transactions at the source system. However, asynchronous replication typically involves a risk that a read request on the replica table may return information that is outdated compared to the source table.

FIG. 1 is a diagram 100 illustrating database data replication using DML statements and write log shipping. As depicted in the diagram 100, a client 110 (e.g., a client computing device) communicates with a source system 120 (e.g., one or more server computers operating a database at which data will be modified and replicated to a replica system). For example, the client 110 can perform database manipulation operations (e.g., insert data, change data, and/or delete data in one or more database tables stored at the source system 120).

The source system 120 includes a number of components, including a session/transaction component 122, a DML execution component 124, and storage engines 126 (e.g., row-store and/or column-store storage engines). The storage engines 126 store database data in a persistency store 128 (e.g., hard disk drives, solid-state drives, and/or other types of persistent storage).

The source system 120 can receive data manipulation operations (e.g., operations to add, modify, and/or delete data, such as in the form of insert, update, and/or delete DML statements) from the client 110 and/or from other clients or sources. Upon receiving the data manipulation operations (e.g., via the session/transaction component 122), the source system 120 can execute DML statements to perform the data manipulation operations (e.g., via the DML execution component 124). The source system 120 can also create write log entries incorporating the DML statements and send them (as depicted at 140) to a replica system 130 for execution.

The replica system 130 can receive the write logs and execute the entries contained within, including DML statements (e.g., along with other parameters, values, and/or other associated information in the write logs), transaction commit operations, and DML statement precommit operations. For example, the replica system 130 can include components similar to the source system 120 (e.g., session/transaction component 132, DML execution component 134, storage engines 136, and persistency store 138). The replica system 130 can replicate database information stored at the source system 120 (e.g., one or more database tables) via DML statements (e.g., so that database data changes at the source system 120 are replicated to the replica system 130). In some cases, the replica system 130 can execute the DML statements and return results to the source system 120. Results can be provided to the source system 120 and/or to the client 110.

Figure 2:
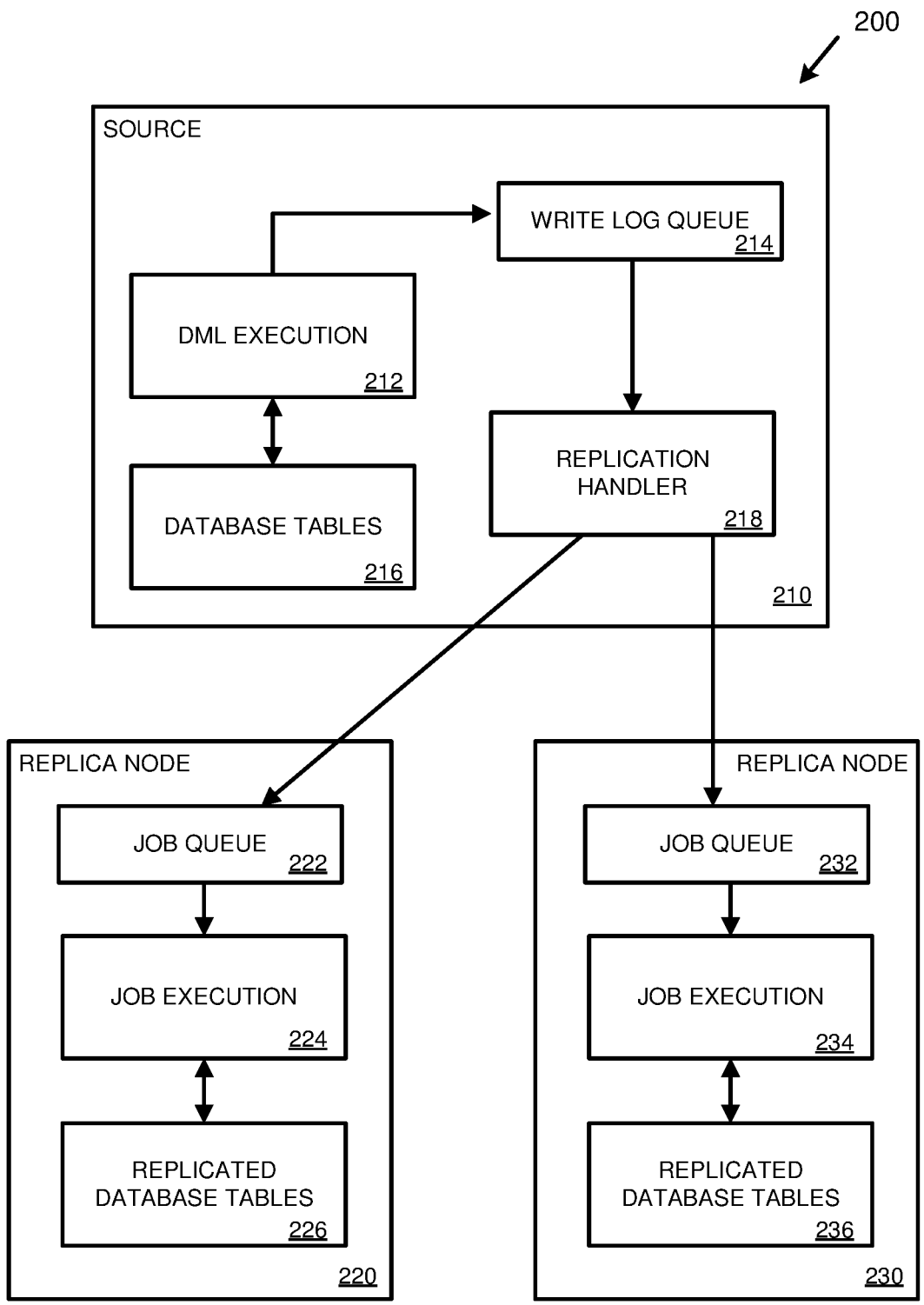
FIG. 2 is a diagram depicting a database environment for performing replication of database tables using DML statements and write log shipping.

FIG. 2 is a diagram depicting an example database environment 200 for performing replication of database tables using DML statements and write log shipping. The database environment 200 includes a number of replica nodes 220, 230 among which database tables 216 are replicated.

As depicted in the database environment 200, a source system 210 (e.g., a source host or a source node) comprises a number of components supporting database activity and replication. Specifically, the source system 210 stores database tables 216 (e.g., in memory and/or in one or more persistent storage repositories). The source system 210 includes a DML execution component 212 that executes DML statements that read and/or write database data in the database tables 216. The source system 210 also includes a write log queue 214 for storing write logs and a replication handler 218 for sending write logs to other database nodes (e.g., to replica nodes 220 and/or 230).

In order to replicate database tables (e.g., to replicate the database information stored in one or more database tables so that the database tables remain synchronized between database nodes), the DML execution component 212 of the source system 210 can receive a DML statement (e.g., originally from a user or from another source) and execute the DML statement on one of the database tables 216 (e.g., to add, modify, and/or delete data in the database table, which can be called a primary table). The DML execution component 212 can then create a write log entry (which includes the DML statement) and insert the write log entry into the write log queue 214. Once the write log entry has been inserted into the write log queue 214, the DML execution component 212 can be free to handle other DML requests (e.g., the DML execution component 212 does not have to wait for the write log entry to be replicated to the replica nodes 220, 230 before performing other DML operations).

In some implementations, the DML execution component 212 includes a number of threads of execution, where each thread can work independently to handle DML requests. In such an implementation, a thread can execute a DML statement, create a write log entry (which includes the DML statement), insert the write log entry into the write log queue 214, and be free to handle other requests without having to wait for replication of the DML statement to be completed (e.g., for the DML statement to be sent to other nodes or for results of DML statement execution at the other nodes).

In some implementations, the DML execution component 212 determines parameter values and/or nondeterministic values used by the DML statement when executing the DML statement in relation to the database table. In such implementations, the DML execution component 212 can include the parameter values and/or nondeterministic values in the write log entry with the DML statement. The DML execution component 212 can also include a transaction identifier in the write log entry to identify the replication transaction. The DML execution component 212 orders the DML statements for execution such that any given DML statement is not executed until the underlying data it affects is ready. For example, an update statement for a record is not executed until after an insert statement adding the record. The DML execution component 212 can modify information (e.g., in non-deterministic values or row-ID values that act as state counters) indicating how to serialize DML statements in the write log entries.

The source system 210 also comprises a replication handler 218 for handling write log entries in the write log queue 214. The replication handler 218 can take write logs from the write log queue 214 and send them to one or more replica nodes (e.g., node 220 and/or node 230) in order for the replica nodes 220, 230 to perform replication by executing the DML statements contained within the write log entries. For example, the replication handler 218 can retrieve a write log entry from the write log queue 214 and send the write log entry to node 220 and/or to node 230. The write log entry can pass through various internal or external structures, queues, etc., when it is routed to the replica nodes 220, 230.

A replica node receiving a write log entry, such as replica node 220, can receive the write log entry and insert it into a job queue 222. Reception of the write log entry by replica node 220 can be performed by a separate component (e.g., a write log receiver component, not pictured) or by the job queue 222. Once the write log entry has been received and inserted into the job queue 222, a job execution component 224 can retrieve the write log entry and execute the DML statement contained within (e.g., along with parameter values and/or nondeterministic values, if present) on one of the replicated database tables 226. Other replica nodes can also receive the write log entry from the replication handler 218 (e.g., node 230, with its own job queue 232, job execution component 234, and replicated database tables 236).

In some implementations, database tables can be replicated on a node-by-node basis. For example, a source system (e.g., source system 210) can store a full set of database tables while a first replica node (e.g., node 220) may replicate some or all of the tables stored at the source system and a second replica node (e.g., node 230) may also replicate some or all of the tables stored at the source system 210. Furthermore, each replica node 220, 230 may replicate the same tables as one or more other replica nodes, or may replicate different tables from one or more other replica nodes. As an example, source system 210 may store database tables 1, 2, and 3. Replica node 220 may replicate database tables 1 and 2. Replica node 230 may replicate database tables 1 and 3.

In some implementations, a write log entry that contains a DML statement modifying a particular database table is sent to replica nodes that replicate the particular database table (e.g., only to those replica nodes that replicate the particular database table and not to replica nodes that do not replicate the particular database table). For example, the replication handler 218 can send a write log entry from the write log queue 214 to replica nodes that replicate a database table being modified by the DML statement within the write log entry.

In some implementations, grouping of write log entries is performed. For example, multiple write logs entries that modify database tables replicated at a particular replica node can be grouped and sent to the particular replica node. Consider an example arrangement in which the source system 210 stores store database tables 1, 2, and 3, replica node 220 replicates database tables 1 and 2, and replica node 230 replicates database tables 1 and 3. In this example arrangement, if the write log queue 214 contains three write logs entries that all modify database information stored in database table 1, then the three write log entries can be grouped (e.g., combined into a write log group) and sent to both replica node 220 and replica node 230 which both replicate table 1. If the write log queue 214 contains two write logs entries that both modify database information stored in database table 3, then the two write log entries can be grouped and sent to replica node 230, which replicates database table 3 (and not to replica node 220, which does not replicate database table 3). If the write log queue 214 contains two write log entries that both modify database information stored in database table 1 and one write log entry that modifies database information stored in database table 2, then a first write log group can be created for sending all three write log entries to replica node 220 and a second write log group can be created for sending only the two write log entries that modify table 1 to replica node 230.

Write log grouping can be applied so that network resources are utilized more efficiently. For example, to minimize the penalty of replication, write log grouping can be used in which multiple write log entries for multiple clients are grouped into a single network communication. This technique can reduce network resources needed to perform replication and may increase DML execution throughput.

The job execution component 224, 234 of a replica node 220, 230 that receives write log entries can include a number of processes or threads for executing jobs in the job queue. For example, the job execution component 224 of replica node 220 can include a number of job execution threads that retrieve write log entries from the job queue 222 and execute them. In some implementations, the job execution threads can execute write log entries in parallel, which can increase efficiency. In dispatching write log entries, the job execution component 224 can use information (e.g., non-deterministic values or row-ID values that act as state counters) to control the timing of execution, so that any given DML statement is not executed until the underlying data it affects is ready.

In some implementations, DML statements are executed on a source node (or multiple source node) and one or more replica nodes within the same transaction boundary (also called an execution boundary). For example, one or more DML statements can be associated with a transaction (e.g., identified by a transaction identifier). The one or more DML statements associated with the transaction can be executed at a source node (or multiple source nodes), incorporated into write logs and sent to one or more replica nodes, and executed at the replica nodes within the same transaction boundary. In some implementations, the DML statements are executed at the replica nodes within a sub-statement boundary of the overall transaction boundary.

In some implementations, DML statements within a transaction boundary can be rolled back. For example, a DML statement being executed on a source node and one or more replica nodes can be rolled back across the source and replica nodes (e.g., if execution at one of the nodes fails). In some implementations, partial rollback is supported, in which one or more DML statements of a transaction can be rolled back independently of one or more other DML statements of the transaction. For example, if a transaction includes multiple DML statements, and one of the DML statements is rolled back on the source node, that DML statement can be rolled back on any replica nodes as well.

Execution of DML statements within a transaction boundary can provide for database consistency. For example, DML statements can be executed on a source node and one or more replica nodes and committed within the same transaction boundary (e.g., committed using an atomic commit operation).

In some implementations, thread decoupling is used to provide for more efficient replication. In some implementations, separate threads (e.g., dedicated handler threads) perform write log shipping (e.g., operations including retrieving write logs from the write log queue, grouping, and/or sending to replica nodes). Using separate threads for write log shipping and DML execution can free up the DML execution threads from having to perform write log shipping operations (e.g., the DML execution threads can be free to handle other DML operations once they have placed write logs into the write log queue). For example, DML execution threads can take pending DML jobs from other sources without having to wait for results of write logs that have been sent to replica nodes.

Figure 3:
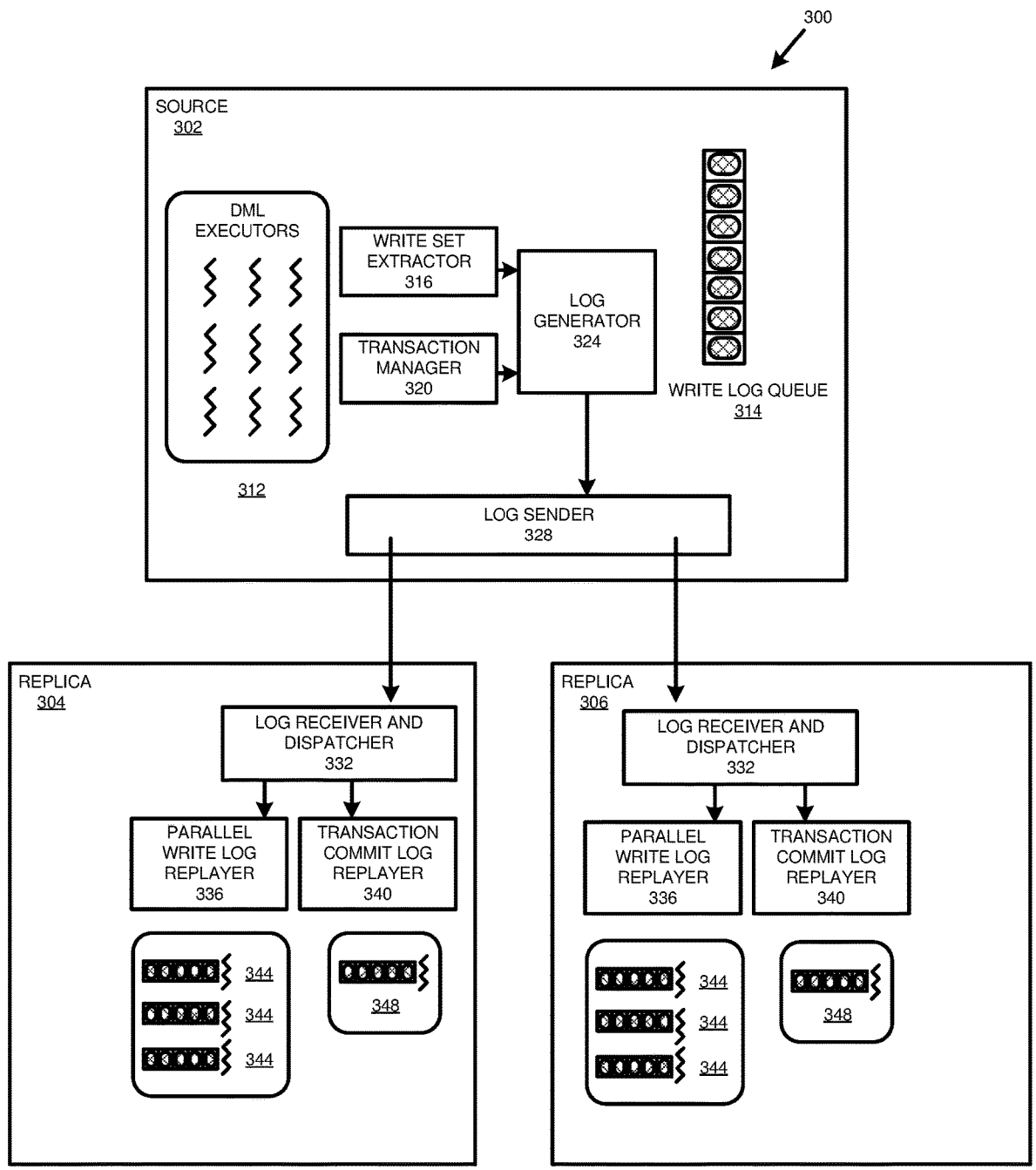
FIG. 3 is a diagram depicting a database environment for performing replication of database tables from a source node to replica nodes.

FIG. 3 is a diagram depicting a database environment 300 for performing replication of database tables from a source system 302 to a replica system having replica nodes 304, 306. While two replica nodes are depicted, replication of database tables can be performed between the source system 302 and any number of replica nodes.

As depicted in the example database environment 300, the source system 302 includes a number of DML executors 312 (threads of execution for handling DML requests). To support replication, a write set extractor 316 extracts appropriate DML information from the DML request. Similarly, a transaction manager 320 monitors transaction commit operations. Commit operations determine when the result of a transaction is available for reading. Read requests will typically receive the last committed version of a record, even if the record is currently being modified by a DML operation.

A log generator 324 communicates with the transaction manager 320 and the write set extractor 316. The log generator 324 generates logs entries for the write and commit operations and adds them to a write log queue 314. The write log queue 314 is emptied, and log entries are sent to appropriate replica nodes (e.g., through one or more intermediary nodes) by a log sender 328 that communicates with the log generator 324. In some cases, write logs can be grouped together such that multiple logs can be sent to a replica node in a single communication. When the database environment includes multiple replicas, replicating different portions of the source system (such as a source host), in particular implementations, the replica node may only receive and execute write logs for tables replicated by that replica node. Accordingly, logical log grouping can take into account the tables replicated by a particular replica node.

Each replica node 304, 306 includes a log receiver and dispatcher 332. The log receiver and dispatcher 332 receives the write log entries from the log sender 328. The log receiver and dispatcher 332 parses the write log entries. Write operations are sent by the log receiver and dispatcher 332 to a parallel write log replayer 336, while commit operations are sent by the log receiver and dispatcher 332 to a transaction commit log replayer 340.

As shown in FIG. 3, the parallel write log replayer 336 includes multiple replayers 344 that can operate concurrently. This structure helps improve system performance by allowing multiple write operations on the replicated table to be carried out simultaneously, in the absence of dependencies between the write operations. In at least some implementations, write logs associated with the same transaction are replayed by the same replayer 344 in the same order that the operations occurred at the source node.

In order to help ensure consistency between the source system 302 and the replica nodes 304, 306, the transaction commit log replayer operates serially, such as with a single replayer 348. Also, the log receiver and dispatcher 332 can use information provided with write log entries to order write operations appropriately, honoring dependencies between write operations.

At least certain implementations of the present disclosure include an additional feature that helps maintain consistency in the system 300. That is, each replicated table has associated with it a row-ID generator. The value of the row-ID generator is incremented each time a write (change) operation is performed on a record within the table. The value is copied to a row-ID column of the database record being changed. When the write log entries are generated by the log generator (324, FIG. 3), the information may be included in the write log entries.

For example, operations inserting a new record will include information for the (new, incremented) row-ID of the inserted record. Operations updating a record will result in the write log including information for the row-ID of the record prior to the write operation and the incremented row-ID after the write operation. Delete operations will include information for the row-ID of the deleted row. In particular implementations, the delete operation does not, at least immediately, result in the deletion of a record. That is, the deleted record can be maintained as a new version of the record and, in some examples, linked to prior record versions. The new record can be assigned a new row-ID. The use of the unique row-ID can assist both in replicating data on an ongoing basis, and when replication is resumed, such as due to manual intervention or a system exception.

Both source 302 and replica tables, such as tables located at replica 304, can include the row-ID information, such as in a column of the respective table. When replication is restarted, such as on restart of the replica node 304 after a system exception, a manual restart, or switching off and switching back on replication services, the row-ID column values of the source table hosted by the source 302 can be compared to the row-ID column values of its replica table the replica node 304. If there are any mismatching row-ID between them, then they can be identified as a lost change and can be resolved by re-sending the corresponding data from the source table or by deleting the corresponding row at the replica.

For example, if a row-ID value is found both at the source 302 and the replica 304, the data is consistent and no action needs to be taken for that row-ID upon restarting replication. If a row-ID value is found only at the table at the source 302, the corresponding database record is sent (or resent) from the source 302 to the replica 304 for insertion into the copy of the table. If a row-ID value is found only at the table copy hosted by the replica 304, it can be deleted from the table copy.

The above-described method for synchronizing source and replica tables upon restarting replication can be modified to improve performance or reduce the changes of data being inconsistent between source and replica tables, or between copies of different replicated tables hosted in the replica 304. On such modification that may be used with at least certain Examples of the present disclosure is described in Example 8.

Example 4—Record Version Visibility

Regarding the property isolation of the four properties in the principles of ACID (atomicity, durability, isolation, and durability) commonly used in guiding the operation of database environments, at least some database environments of the present disclosure can provide one or both of two variants of snapshot isolation: statement-level snapshot isolation (SSI) and transaction-level snapshot isolation (TSI). Snapshot isolation provides non-blocking read access against any concurrent write transactions.

If a transaction consists of one or more statements (such as data manipulation language, or DML, statements), which can be, for example, either of read and write (e.g. INSERT, UPDATE, or DELETE), in SSI, each statement reads data from a snapshot of the committed data at the time the statement started. In TSI, each transaction reads data from a snapshot of the committed data at the time the transaction started, called the snapshot timestamp. In at least some database environments, SSI and TSI can co-exist, such as being configurable on a per user connection. The definitions of SSI and TSI imply that data once read, in a statement or a transaction respectively, should be visible again within the same statement or transaction even though the data has been changed by a different concurrent transaction. For example, when executing a join query with some predicate, the same record can be visited multiple times within a single statement scope since the intermediate result of a query operator can be passed to the next query operator by a set of references to the filtered records (e.g. row IDs) without necessarily fully materializing them.

Although a Write Skew anomaly can happen under snapshot isolation, where two transactions concurrently read overlapping data, make disjoint updates, and commit, it typically can be avoided in practice by using SELECT FOR UPDATE properly in applications. Contrasted to other concurrency control options like optimistic concurrency control or two-phase locking, a benefit of snapshot isolation is that read queries can proceed without any query abort or any lock waiting situation, even though they read a database object which is being changed by other transactions.

Typically, in SSI and TSI, a snapshot timestamp is assigned to a new snapshot when the new snapshot starts. Under SSI, each statement has its own snapshot, while each transaction has its own snapshot under TSI. The cost of the snapshot timestamp assignment operation typically becomes more significant in SSI than in TSI, because the snapshot timestamp is assigned for each transaction under TSI, but for each statement under SSI. SSI thus offers more room for optimizations within the database kernel, because it can be known which tables or partitions need to be accessed in that particular snapshot scope by looking up the statement's query plan before actually executing it.

In some aspects of the present disclosure, a database environment includes a table having database records. A new version of a record is created on each update operation instead of overriding the existing record version. Even for record deletion operations, a new version header is typically created with an empty payload instead of deleting the existing record right away. When creating a new record version, a versioning token, such as a version timestamp, representing the version creation time (the commit time (e.g., commit ID) of the transaction creating the version), is stored, such as in a version header. In a particular implementation, the version timestamp is derived from a global synchronization token, such as a transaction commit timestamp, maintained by a central transaction manager (which may be, for example, the source node 302 of FIG. 3) which will be incremented on each commit of a write transaction. According to a particular example, the versions of a single record are chained to each other in a sorted order, such as by their version timestamps. Older versions in the version chain can be deleted, such as in a process sometimes referred to as garbage collection, when specified criteria are met, such as when it is determined that there is no potential reader in the system for that record version. In a particular implementation, there being no potential reader in the system can be detected by maintaining a minimum value of snapshot timestamps of active snapshots in the system and comparing it with the version timestamps of the garbage collection candidates.

When a query tries to read a record version, the visibility of the record is checked by comparing the query's snapshot timestamp with the version timestamp of the candidate record version. If the version timestamp of the record is higher than the snapshot timestamp of the query, the particular record version should typically not be visible to the query because the created version of the record was committed after the query started. Otherwise, if the version timestamp of the record is not higher than the snapshot timestamp of the query, the record version should typically be visible to the query.

One potential issue in snapshot isolation implementation is updating version timestamps of multiple different rows in a transaction with the transaction's assigned commit timestamp in an atomic way. At version creation time, the embracing version timestamp can typically be correctly and finally set only after the embracing write transaction receives its commit timestamp within the commit procedure. However, if the versions of the write transactions are updated with their commit timestamp one by one, then some of those versions could be visible to another snapshot while the others might still be invisible. Such an outcome would not fully comply with the atomicity rule in the ACID properties.

To avoid this potential anomaly concerning visibility atomicity, a transaction context may be maintained for each write transaction. When a write transaction starts its first write operation, a transaction context entry is created. In a particular example, all created row versions store a pointer to the transaction context entry in their version header field. At commit time, the transaction context entry is updated with the write transaction's commit timestamp, and thus is available to the other versions through the pointer to the transaction context entry. After the transaction commit processing is completed, the commit timestamp written in the transaction context entry is asynchronously propagated to the version timestamp fields. The transaction context entry may then be garbage-collected. With this atomic indirect commit timestamp assignment to the created versions, visibility atomicity is still facilitated under this snapshot isolation implementation.

Figure 4:
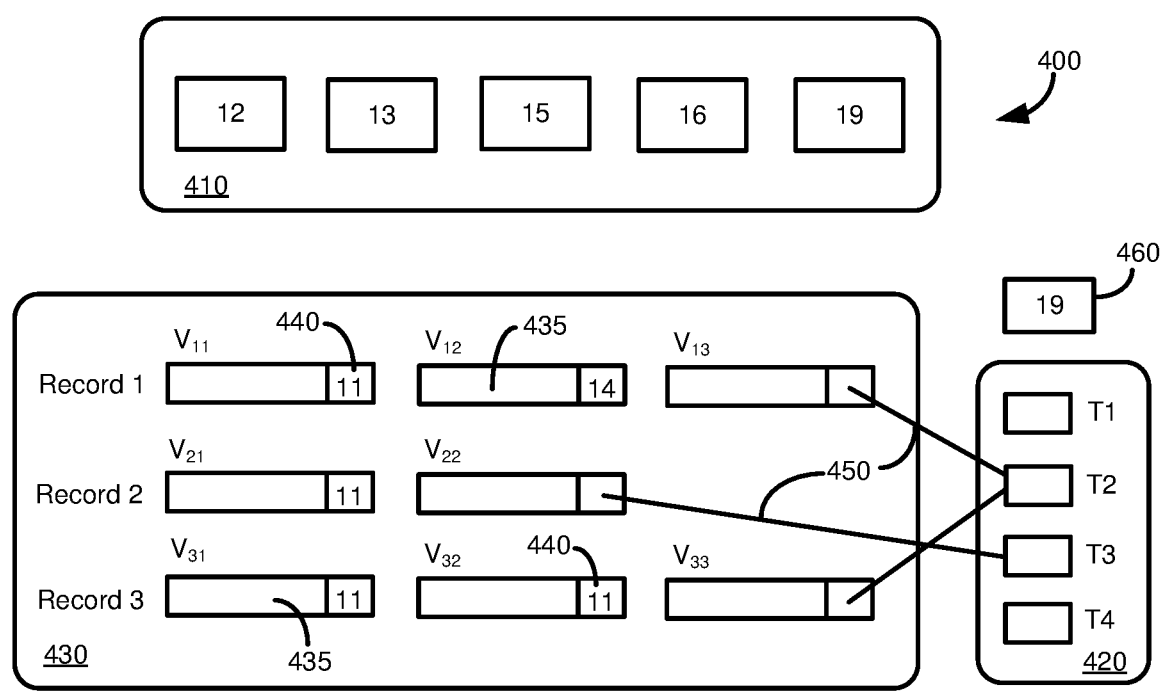
FIG. 4 is a diagram depicting an architecture of a transaction context providing version space management that may be used in at least certain implementations of the present disclosure.

FIG. 4 depicts an architecture 400 illustrating a transaction context providing version space management. The architecture 400 includes a snapshot timestamp store 410 that stores five active timestamps 12, 13, 15, 16, and 19. Architecture 400 further includes a transaction context store 420 for four active write transactions, T1, T2, T3, T4, each with their own transaction context entry. A record chain store 430 holds three database records, Record 1, Record 2, and Record 3, each with own version chain of record versions 435. Each record version 435 includes a version timestamp 440.

As shown, from the viewpoint of a snapshot whose snapshot timestamp is 12, $V_{11}$ and $V_{21}$ are visible (because their version timestamps are less than the snapshot timestamp) but the other record versions 435 are not. $V_{13}$, $V_{22}$, and $V_{33}$ do not have their version timestamps yet, because their write transactions are not yet committed. The timestamp of versions $V_{31}$ and $V_{32}$ are greater than the snapshot timestamp (12), and so are not visible in the snapshot. Under this transaction state, the record versions 435 store a pointer 450 to the corresponding transaction context entries ($T_2$ and $T_3$). Once $T_2$, for example, commits, then the transaction commit timestamp (19, as shown) of the transaction manager 460 at that time is copied to the transaction context entry 420, thus providing visibility atomicity indirectly. Note that the data structures in FIG. 4 are provided to give a conceptual overview, but their actual implementation can be different. For example, depending on whether the corresponding table is a row store or a column store, both of which may be supported in a single database system, the storage layout of the record versions may be different.

Although read statements do not acquire locks in at least certain implementations of the present disclosure, a write transaction typically acquires an exclusive lock of its updated record to ensure a serializable schedule of concurrent write operations. If the latest version of the record is not visible to the snapshot after the exclusive record lock is acquired, then a transaction under TSI may throw an error to the end user. A statement under SSI, however, may be configured to restart the statement by substituting its statement timestamp with a newer value of the transaction commit timestamp. In at least certain examples, database objects are finally updated after lock acquisition and validation. In further examples, lock tables are partitioned according to the location of their corresponding tables, or partitioned together with a multi-node deadlock detection implementation, to detect when dependencies between write operations carried out at different nodes prevent transaction commitment.

Table 1 provides a set of symbols that may be used to describe a distributed database transaction protocol.

TABLE 1

Notations

| Symbol | Description |
| --- | --- |
| CTS | Transaction commit timestamp of the source node, incremented when a write transaction commits |
| CID($T_i$) | Commit ID of a write transaction $T_i$, assigned from CTS when $T_i$ commits |
| pCID($T_i$) | Precommit ID of a write transaction $T_i$, assigned from CTS when $T_i$ pre-commits |
| Status($T_i$) | Status of a write transaction $T_i$, either of {Unused, Active, Precommitted, Committed, Aborted} |
| TID($T_i$) | Transaction identifier of a transaction $T_i$ |
| STS(Si) | Snapshot timestamp of a snapshot $S_i$, assigned from CTS when the snapshot (statement or transaction) starts |

Algorithm 1 shows how a statement checks if a record version V should be visible or not to a snapshot S (a statement under SSI or a transaction under TSI). For the visibility decision, first, V's creator transaction's state is checked. If it is aborted or active, then V should not be visible to S (lines 8 to 11). If it is committed, then V's CID is compared to STS(S). V is visible to S only if STS(S) is equal to or larger than V's CID (lines 3-7). Algorithm 1 Visibility decision algorithm: check if a record version V should be visible to a snapshot S or not

```
1:   while TRUE do
2:       if V's status is Committed then
3:           if V's CID ≤ STS(S) then
4:               return TRUE
5:           else
6:               return FALSE
7:           end if
8:       else if V's status is Aborted then
9:           return FALSE
10:      else if V's status is Active then
11:          return FALSE
12:      else if V's status is Precommitted then
13:          if V's pCID ≥ STS(S) then
14:              return FALSE
15:          else
16:              wait until V's status becomes Committed or
                 Aborted
17:          end if
18:      end if
19:  end while
```

In addition to the basic visibility rules, the following extensions are provided. As previously mentioned, and as recited in Algorithm 1, at least certain implementations provide a statement or transaction status of being precommitted, where the final commitment of the statement or transaction is treated as in-doubt, with the visibility decision being delayed until the in-doubt status has been resolved, such as by the statement or transaction being committed. If V's status is precommitted (lines 12 to 17), the corresponding record version's visibility decision is postponed. The precommitted/in-doubt state makes sub-operations of a transaction commit effectively atomic without relying on any latch or lock.

The delayed visibility decision scheme may result in a situation where a read statement may need to wait for another write transaction's commit to be completed. However, this waiting situation is typically uncommon, because it happens when a read statement is trying to check the visibility of a record version which was created by a write transaction committed at the same time as the read attempt. To further reduce the possibility of a reader waiting for an in-doubt transaction to complete, particular implementations of the disclosed distributed database transaction protocol can include early pruning of record versions that will never be visible.

As explained above, the in-doubt period of a transaction is started by setting the transaction's state as precommitted. By assigning pCID, which is typically defined to be smaller than its CID value to be decided later, at the time when the transaction state is set as precommitted, record versions which will never be visible to the pending reader statement, such as because the query was started later than the write operations and thus should only view records that were available when the query was started, can be pruned. More specifically, if STS(S) is smaller than or equal to pCID(T) for a write transaction T and a snapshot S, then STS(S) will also be smaller than CID(T) because pCID(T) is smaller than CID(T) assigned by the commit protocol. Thus, if STS(S)≤pCID(T), it can be determined that the tested version V is not visible to S (lines 13 to 14 of Algorithm 1) without waiting any further.

Figure 5A:
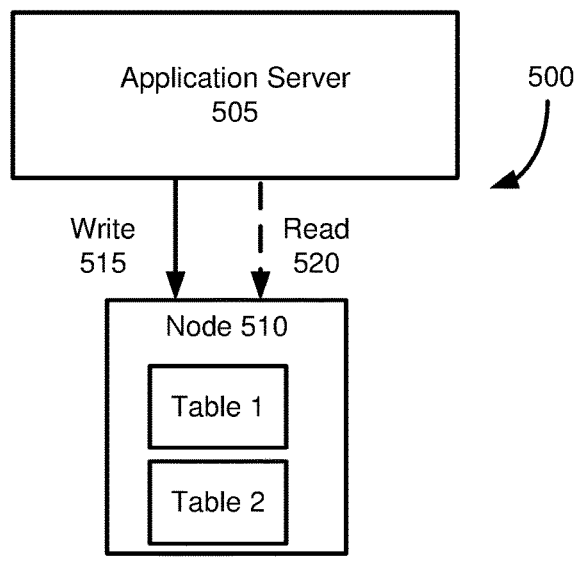
FIG. 5A is a diagram illustrating an unreplicated database system.

Example 5—Synchronization of DML Operations Upon Commit Initiation at Source Node As described above, table replication can be useful in facilitating the implementation of distributed database systems. FIG. 5A illustrates a database environment 500 that does not include data replication. The environment 500 includes an application server 505 that communicates with a node 510 acting as a database server and hosting Table 1 and Table 2. The application server 505 sends write requests 515 and read requests 520 to the node 510. Because the environment 500 includes a single node 510, the performance of the environment 500 is tied to the resources of a single host, and can thus degrade if the number of write requests 515 or read requests 520 becomes too large.

Figure 5B:
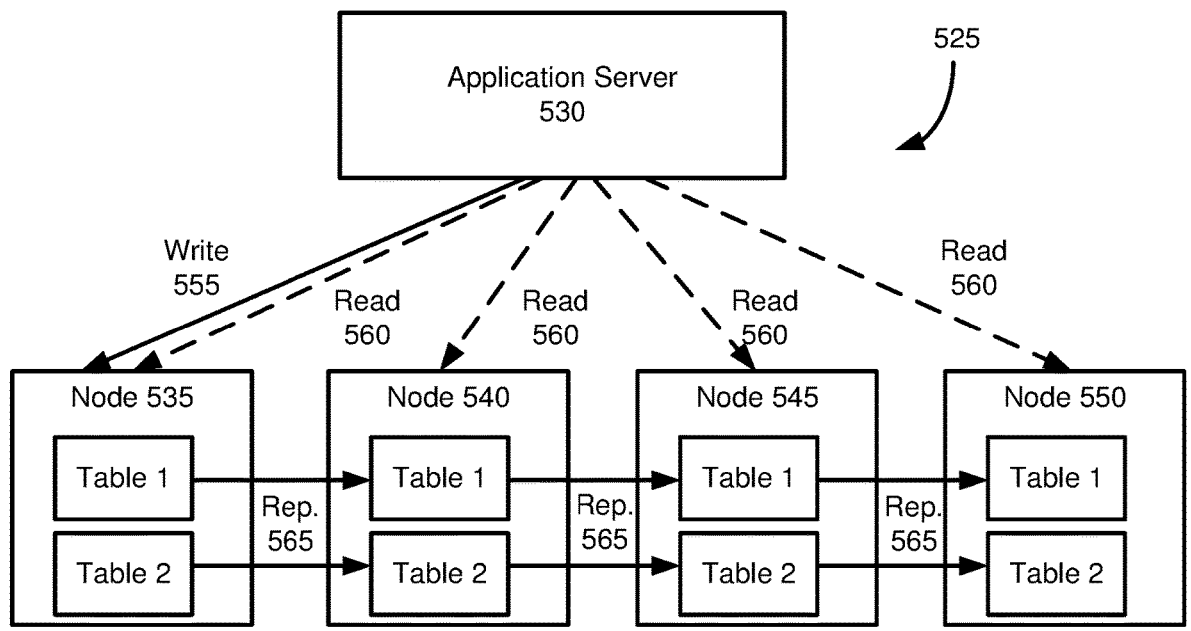
FIG. 5B is a diagram depicting how replicating database tables from a source node to replica nodes can provide for load balancing in a database system.

FIG. 5B illustrates an environment 525 providing for replication of data between a plurality of database server nodes 535, 540, 545, 550, each of which is in communication with an application server 530 and hosts Table 1 (or a copy thereof) and Table 2 (or a copy thereof). The application server 530 sends write requests 555 to the node 535, which stores the "source" versions of Table 1 and Table 2. However, the application server 530 can send read requests 560 to any of the nodes 535, 540, 545, 550.

The results of the write requests 555 sent to node 535 are propagated to nodes 540, 545, 550 by a replication process 565. Because the node 535 is the only node that receives the write requests 555 for Tables 1 and 2, and changes to those tables at node 535 are replicated to the other nodes 540, 545, 550, node 535 acts as a source node for Tables 1 and 2. Nodes 540, 545, 550 act as replica nodes for Tables 1 and 2.

For purposes of query processing and other online analytical processing (OLAP) operations, the environment 525 of FIG. 5B provides for load balancing as compared with the environment 500 of FIG. 5A, as read requests 560 can be sent to the source node 535 and any of the replica nodes 540, 545, 550.

Figure 6A:
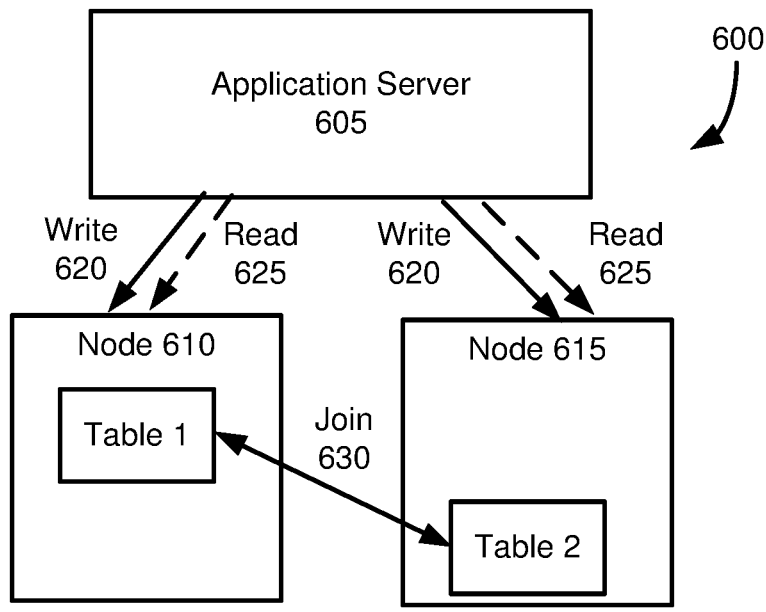
FIG. 6A is a diagram depicting how inefficient cross-node join operations may be executed in a distributed database system without table replication.

Table replication can also help a database system avoid inefficient cross-node join operations. FIG. 6A illustrates a database system 600 having an application server 605 that is in communication with a database server node 610 hosting Table 1 and a database server node 615 hosting Table 2. Application server 605 sends write requests 620 and read requests 625 to node 610 for Table 1. Application server 605 sends write requests 620 and read requests 625 to node 615 for Table 2. An operation, such as a SQL join operation 630, accessing Tables 1 and 2 must access both nodes 610 and 615, which can cause performance degradation compared with an operation where only one database server node is accessed.

Figure 6B:
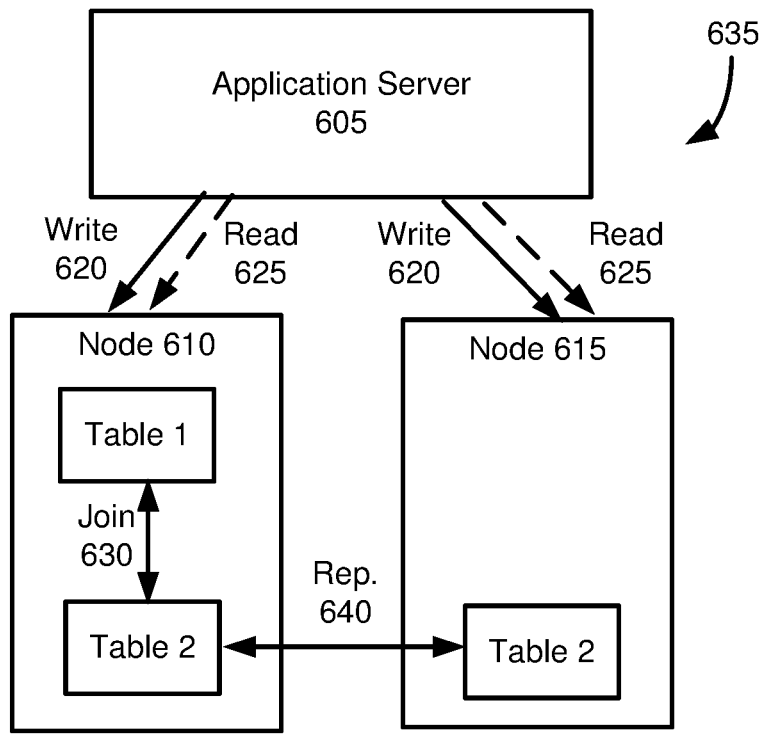
FIG. 6B is a diagram illustrating how replication can be used in a distributed database system to avoid cross-node join operations.

FIG. 6B illustrates an alternative environment 635 that is generally similar to the environment 600. However, Table 2 has been replicated from node 615 to node 610 using a replication process 640. A read-only operation, such as SQL join operation 630, accessing both Tables 1 and 2 can simply be routed to node 610, improving performance by helping to avoid cross-node operations.

As described above, replication can be carried out synchronously or asynchronously. Asynchronous table replication (ATR) can help reduce performance degradation resulting from table replication, but it can be complex to implement and use. For example, because replication is asynchronous, a replica table may have an outdated state compared with its source table. To address this issue, application developers may need to distinguish their workloads or queries that run on such asynchronous replicas, versus those workloads or queries that run only on the source node, or on a replica operating under synchronous replication.

Figure 7:
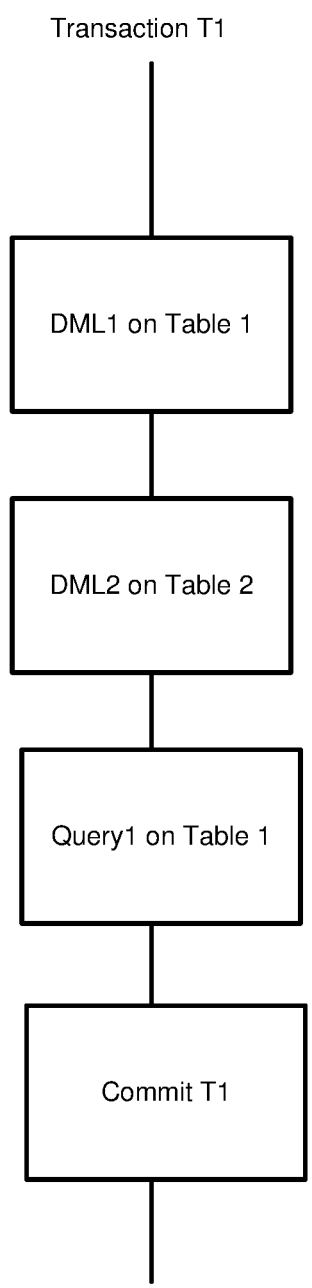
FIG. 7 is a diagram of example database operations that may be included in a database transaction, illustrating the dependency of later operations on earlier operations.

Synchronous table replication provides a simpler usage model, because all the replicas have the same state as their source tables. However, typical synchronous table replication implementations add high performance overhead to source transactions, particularly in view of the following two implementation issues. Typical synchronous table replication protocols synchronize the source table with the replica tables for each DML statement. Synchronous table replication is implemented in such a way because subsequent read operations in the same transaction may try to read data changes from the replica node. For example, the transaction execution scenario of FIG. 7 includes DML operations DML1 and DML 2 that are executed on the source node for transaction T1. Query1 should be able to read the outcome of DML1 because both Query1 and DML1 belong to the same transaction T1. If DML1 is asynchronously propagated to the replica, then there is chance that when Query1 is dispatched to the replica, Query1 may not see the result of execution of DML1, even though DML1 was executed at the source node as part of the same transaction. (For example, Query1 may arrive before DML1 at the replica node.) Although the example transaction of FIG. 7 includes two DML statements, in general, a transaction can include any number of DML statements, up to an implementation-dependent threshold. Also, in general, a transaction can include any number of queries, up to an implementation-dependent threshold.

Figure 8:
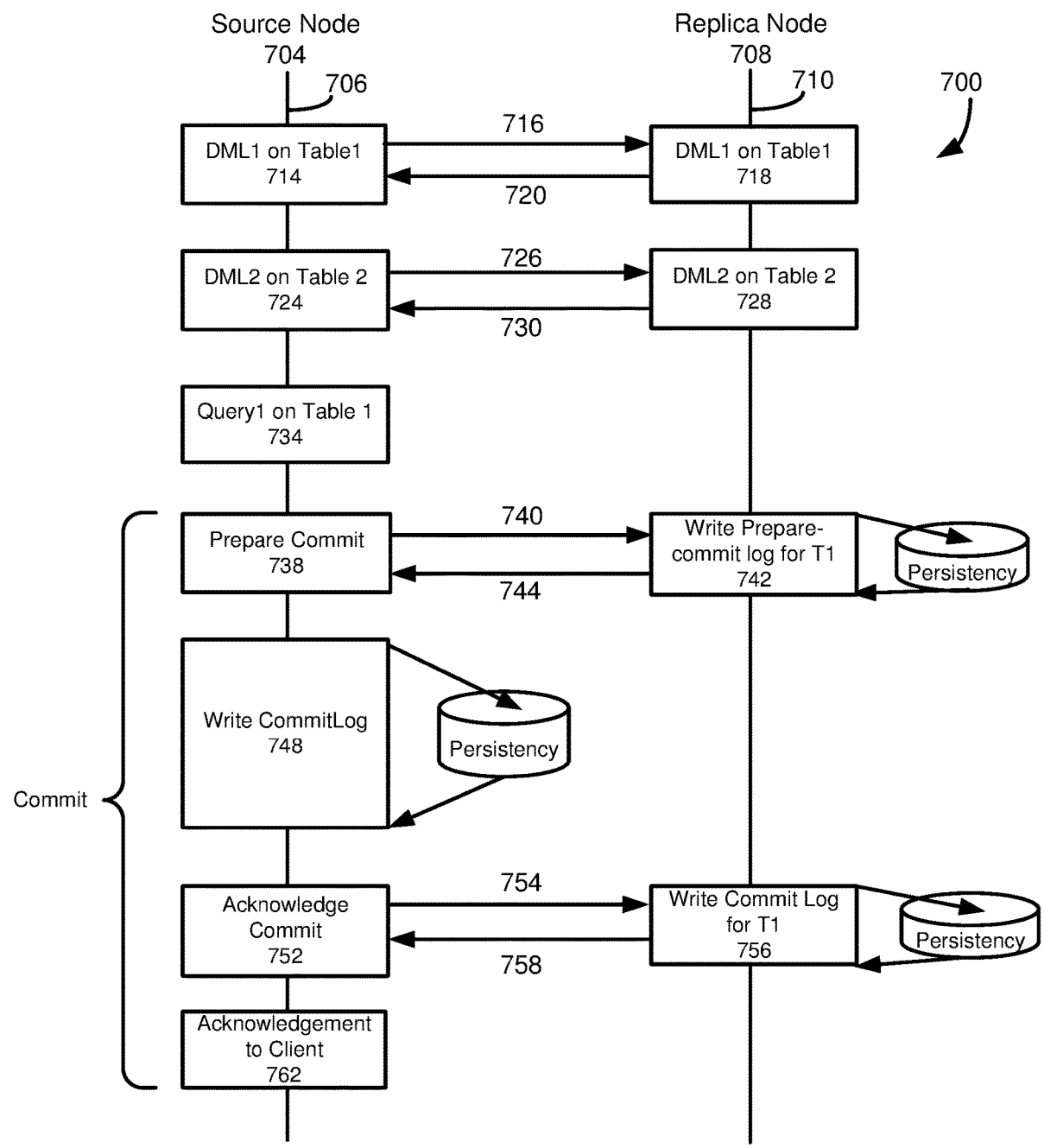
FIG. 8 is a diagram depicting a two-phase commit protocol to commit a transaction replicated from a source node to a replica node.

Another implementation issue that can degrade performance results from typical synchronous table replication following a full two-phase commit protocol between the source node and its replica nodes to commit a transaction. Conventional two-phase commit protocols as shown in FIG. 8 involve at least two network round trips between the source node and each of its replica nodes when committing a transaction, as illustrated in the protocol 700 of FIG. 8, illustrating execution timelines 706, 710 for, respectively, a source node 704 and a replica node 708.

DML statements DML1 and DML2 are executed at the source node 704 in blocks 714 and 724. These DML statements are synchronously sent to the replica node 708 in communications 716 and 726, respectively. DML1 is executed at the replica node 708 in process 718. DML2 is executed at the replica node 708 in process 728. After execution of DML1 and DML2 at the replica node 708, the replica node 708 sends synchronous acknowledgments to the source node 704 in communications 720 and 730, respectively. In FIG. 8, the source node 704 waits for the synchronous acknowledgement for DML1 before executing DML2. Query1, associated with transaction T1, is executed by the source node in process 734. Note that Query1 is executed after DML1 and DML2 have been synchronized between the source node 704 and the replica node 708, with synchronous acknowledgements received from the replica node 708.

When the transaction T1 is to be committed, in step 738, the source node 704 prepares the replica 708 to commit the transaction by sending a synchronous prepare commit request 740. After receiving the notification 740, the replica node 708 prepares the transaction for commitment in block 742, including writing a prepare-commit log to persistent storage and marking the transaction as "in-doubt" at the replica node 708. The replica node 708 then sends a synchronous prepare commit acknowledgement 744 to the source node 704.

When the source node 704 receives the acknowledgement 744, the source node 704 writes a commit log for the transaction in block 748, including writing the commit log to persistent storage. The source node 704 sends a synchronous notification, or commit request, 754 to the replica node 708 in block 752. When the notification 754 is received by the replica node 708, the replica node 708, in block 756, writes a commit log for the transaction, including writing the commit log to persistent storage and marks the transaction as "committed" at the replica node 708. The replica node 708 then sends a synchronous commit acknowledgement 758 to the source node 704. Upon receiving the commit acknowledgement 758, the source node 704 acknowledges the commit to the client (not shown) in block 762.

In the conventional two-phase commit protocol 700, the execution of every DML statement requires a network round trip between the source node 704 and the replica node 708. Two additional round trips are required as part of the commit process. These network communications can delay transaction processing, and can increase the network and processing loads at the source node 704, which can be undesirable, particularly if the system using the protocol 700 include multiple replica nodes. Further delays are incurred by the system waiting to acknowledge the commit to the client in block 762 until the write logs have been written to persistent storage at both the source node 704 and the replica node 708, in blocks 748, 756.

Examples described in this section (Example 5) provide a table replication protocol that can eliminate or reduce the performance overhead of typical synchronous table replication implementations, while still providing synchronous propagation of updates to replicas. That is, the operations at the source and replica nodes are synchronized no later than the time the transaction is committed by the source node. In certain implementations, the table replication protocols described herein can be applied to systems that include multiple replica nodes for a given source table. In addition, the protocols can be applied to systems with multiple source nodes, or systems with multiple source nodes and multiple replica nodes. However, for simplicity of discussion, the present disclosure continues with a discussion of an example using a single source node and a single replica node.

Figure 9:
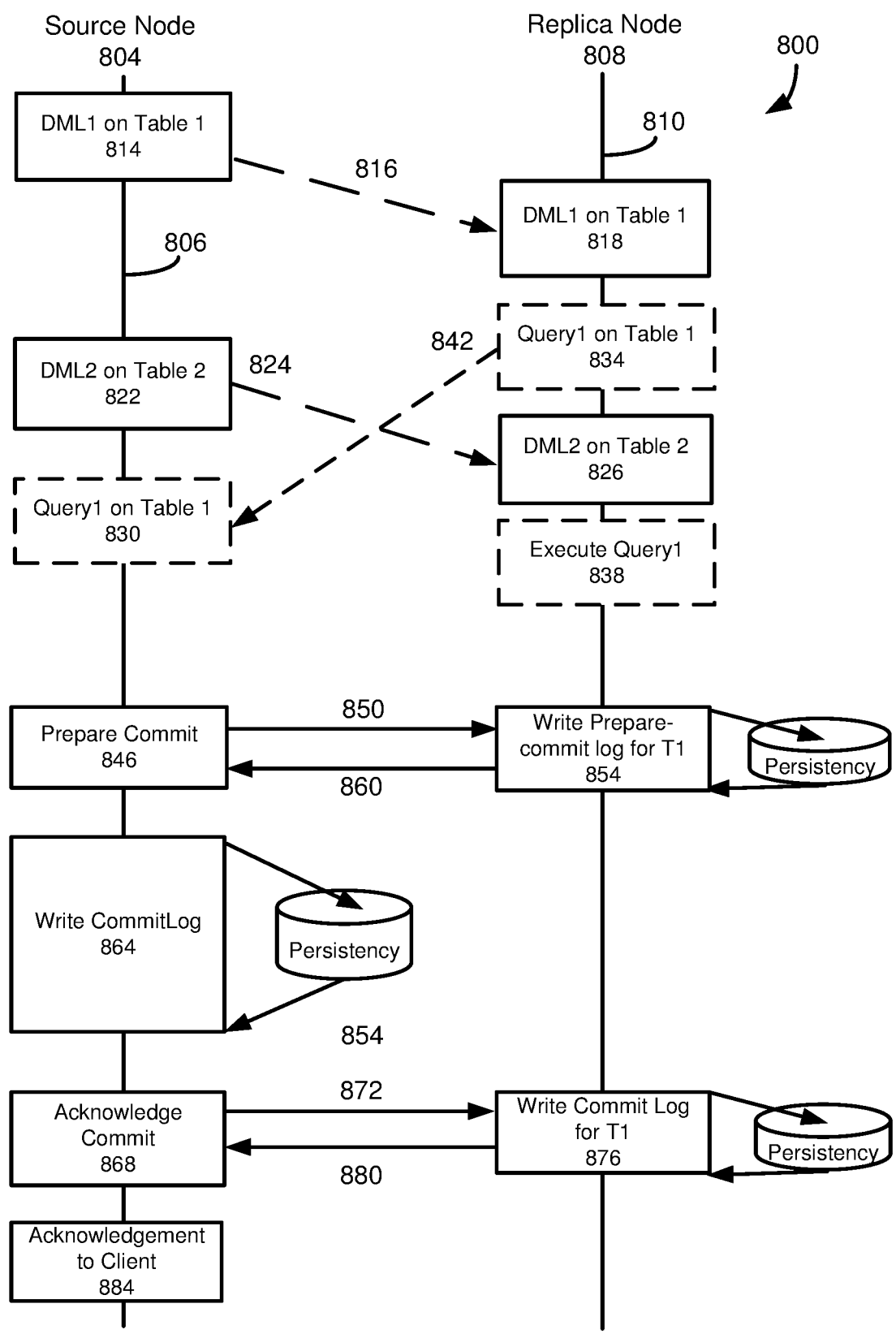
FIG. 9 is a diagram of a protocol in which database operations for a transaction are asynchronously sent from a source node to a replica node, with synchronous communications between the source node and the replica node to precommit the transaction at the replica node.

According to one aspect of this Example 5, DML statements of a transaction at the source node are asynchronously propagated to the replica node, but they are synchronized at the time the transaction is committed at the source node. FIG. 9 presents an example protocol 800 implementing this aspect of the present disclosure. The system implementing the protocol 800 has a source node 804 and a replica node 808 with respective execution timelines 806 and 810. In block 814, the DML statement DML1 on Table 1 maintained by source node 804 is executed at the source node 804. DML1 is asynchronously sent to the replica node 808 by the source node 804 in communication 816. DML1 is executed on the replica node 808 at block 818.

In process 822, another DML statement DML2 is executed on Table 2 maintained by the source node 804. DML2 is asynchronously sent to the replica node 808 by the source node 804 in communication 824. DML2 is executed on the replica node 808 at block 826. Because communication 816 is asynchronous, the source node 804 does not need to receive an acknowledgement from the replica node 808 that execution of DML1 in block 818 is complete before executing DML2 in block 822.

In optional process 830, Query1, accessing Table 1 as part of the same transaction as DML1 and DML2, is executed at the source node 804. According to some implementations of this Example 5, Query1 is executable at source node 804 even though the transaction has not yet committed, and DML1 and DML2 may not yet be executed at the replica node 808, when Query1 is part of the same transaction as DML1 and DML2 (so-called read-own-write scenarios).

In some examples when a query in a transaction, received by the system implementing the protocol 800, accesses tables updated by one or more DML statements in the same transaction, the query is sent directly to the source node 804 by a database client (step 842). In other examples, the query may initially be received by the replica node 808, as illustrated in optional block 834. In this scenario, when initially received at the replica node 808, Query1 waits until the pending DML statements, DML1 and DML2, in the same transaction have arrived, asynchronously, from the source node 804, and are replayed at the replica node 808 in blocks 818 and 826. Once DML1 and DML2 have executed on the replica node 808, Query1 executes at the replica node 808 at optional block 838.

In a specific example, the transaction includes a Sequence ID value that is incremented when a DML statement is executed. If Query1, when originally received by the replica node 808, is associated with a Sequence ID that is higher than the Sequence ID currently known to the replica node 808, the execution of Query1 at the replica node 808 can be delayed until the Sequence ID of the replica node 808 catches up to the Sequence ID of Query1 through the execution of the earlier DML statements in the same transaction as Query1.

In other implementations, the replica node 808 forwards Query1 to the source node 804, such as in optional communication 842. In a particular example, the execution of Query1 is delayed pending the execution of DML1 and DML2 of the same transaction on the replica node 808. However, if a certain predefined threshold of the waiting time is exceeded, then Query1 is re-routed by the replica node 808 to the source node 804 in communication 842, and Query1 is then executed at optional block 830 by the source node 804. The predefined threshold may depend on a particular implementation and can be, for example, about 0.1 milliseconds, about 0.25 milliseconds, about 0.5 milliseconds, about 0.75 milliseconds, about 1 millisecond, about 1.5 milliseconds, about 2 milliseconds, about 5 milliseconds, about 10 milliseconds, or about 50 milliseconds, such as being 0.1 milliseconds, 0.25 milliseconds, 0.5 milliseconds, 0.75 milliseconds, 1 millisecond, 1.5 milliseconds, 2 milliseconds, 5 milliseconds, 10 milliseconds, or 50 milliseconds. In further implementations, the predefined threshold is between about 0.05 milliseconds and about 50 milliseconds, between about 0.1 milliseconds and about 10 milliseconds, between about 0.25 milliseconds and about 5 milliseconds, between about 0.5 milliseconds and about 2.5 milliseconds, or between about 0.1 milliseconds and about 1 millisecond, such as being between 0.05 milliseconds and 50 milliseconds, between 0.1 milliseconds and 10 milliseconds, between 0.25 milliseconds and 5 milliseconds, between 0.5 milliseconds and 2.5 milliseconds, or between 0.1 milliseconds and 1 millisecond. In other implementation, the predefined threshold has some other value.

The database environment implementing the protocol 800 is typically designed to provide that a query, such as Query1, are able to see changes made within the same transaction (i.e., to ensure read-own-write semantics) as that query. In a particular example, an updated table list is maintained for the transaction. The table list is checked whenever a query is started. If the query accesses a table changed in the same transaction, the query is routed to the source node 804 for the table, or the query's execution is delayed until the previous DMLs of the transaction are replayed at the target replica node.

In another implementation, the updated table list is sent to, and cached at, a transaction context of a client library. In the event a query will access a table changed within the same transaction, the client can forward the query to the source node 804, rather than to the replica node 808. Not only does this implementation help avoid the query accessing possibly outdated data, it may improve performance compared with having the query first sent to the replica node 808, only to be later sent to the source node 804 by the replica node 808.

In at least certain implementations, the updated table list corresponds to a list used to acquire, check, and release table locks. For example, when a table is updated by a transaction, it can be marked on the list in order to acquire a lock on the table, which may be a shared lock with other transactions. Because the table is already recorded on the list, the same list can be used to determine whether a query will access a table that has been updated within the same context (transaction). Thus, in at least certain examples, this aspect of the present disclosure can leverage existing infrastructure in the database environment in order to facilitate synchronous replication. In other examples, a separate list may be used to track what tables are updated by a transaction, or the tables may be otherwise indicated as being used by a transaction. For example, the tables may be marked with a flag to indicate that they are being updated by a transaction, or may include a field that indicates what transactions are currently updating the table.

When the transaction including DML statements DML1 and DML2 is to be committed at the source node 804, at block 846, the source node 804 sends a synchronous prepare commit request 850 to the replica node 808. The replica node 808 precommits the transaction in block 854, including writing a precommit log to persistent storage and marking the transaction as "in-doubt" at the replica node 808. In an alternative implementation, the transaction is marked as "in-doubt" at the replica node 808 in block 854, but a precommit log is not written to persistent storage.

In at least some implementations of the present disclosure, a precommit log entry is similar to a commit log entry. In a specific example, precommit log entries are generated by the write set extractor 316 and log generator 324, and transmitted by the log sender 328, in an analogous manner as described with reference to FIG. 3 for write operations and commit operations at the source node 302.

In more specific implementations, a precommit log entry may include information in addition to the fact that a DML statement was executed, such as a timestamp. In a particular example, the timestamp is associated with when the precommit operation occurred. During replication, when an operation is precommitted, it is made available to write log replayers, such as parallel write log replayer 344 (FIG. 3). However, the changes are not viewable by other database readers until the entire transaction is committed. In an aspect of the present disclosure, the entire transaction can be committed once every component DML statement has been executed and precommitted.

Once the transaction has been precommitted by the replica node 808, the replica node 808 sends a synchronous acknowledgement 860 to the source node 804. After receiving the acknowledgement 860, the source node 804 commits the transaction in block 864, including writing a commit log for the transaction to persistent storage. After committing the transaction, the source node 804 sends a synchronous commit request 872 to the replica node 808 in block 868. After receiving the commit request 872, the replica node 808 commits the transaction in process 876, including writing a commit log to persistent storage and marking the transaction as "committed" at the replica node. After committing the transaction, the replica node 808 sends a synchronous commit acknowledgment 880 to the source node 804, which then acknowledges the commit to the client (not shown) in block 884.

The commit process in the protocol 800 shown in FIG. 9, including precommit and commit phases as described above, is generally similar to the two-phase commit process 700 shown in FIG. 8. It should be appreciated that sending DML statements asynchronously from the source node 804 to the replica node 808 may be used with other commit schemes. For example, Example 6 describes an alternative commit protocol that may be used with asynchronously sending DML statements to a replica node. The protocol obtained by combining this Example 5 with the commit scheme of Example 6 is described in Example 7.

In FIG. 9, during the synchronous roundtrip at the prepare commit step, between the prepare commit request 850 and acknowledgement 860, the replica node marks the replica-side transaction as in-doubt. If data changed by a transaction whose state is in-doubt is accessed by a query (read operation) outside the transaction, the query execution is postponed until the state of the transaction is changed to committed or aborted. If the transaction were to be committed at the source node 804 without marking the replica-side transaction as in-doubt, there is chance that a query (outside the transaction) which was started at the replica node 808 right after the transaction is committed at the source node 804 may not see the result of the transaction at the replica side. A suitable visibility scheme that may be used with this Example 5 is described in Example 4.

Using the protocol of this Example 5 can improve database performance, as it does not require synchronization between the source node 804 and the replica node 808 for every DML statement. The precommit process can be used as the synchronization point for an entire transaction, versus typical synchronous replications protocols that require two synchronization points for the commit process, and an additional synchronization point for each DML statement in the transaction. If desired, and as shown in FIG. 9, the protocol 800 can include additional synchronization points, such as during the commit process (commit request 872 and acknowledgement 880). The use of an additional synchronization point during the commit process can be useful in certain replication scenarios, such as when the replica nodes are used for "high-availability data" purposes, instead of, or in addition to, load balancing.

If desired, communications between the source node 804 and the replica node 808 can be grouped to further reduce the effect of network communications on the time needed to commit transactions at the source host 804, or to precommit or commit transactions on the replica node 808. For example, concurrent precommit requests 850 or concurrent commit requests 872 can be grouped by the source node 804 into a single physical network call. Similarly, precommit acknowledgements 860 or commit acknowledgements 880 from the replica node 808 can be grouped into a single physical network call.

In FIG. 9, although the DML statements are asynchronously propagated to the replica node, the pre-commit operation 854 at the replica node 808 (which marks transaction T1 as in-doubt) does not execute until all of the DML statements of that transaction are replayed at the replica node 808. The transaction does not commit at the source node 804 until the transaction is precommitted at the replica node 808. Thus, compared with fully asynchronous replication, the protocol of this Example 5 can potentially increase transaction commit latency.

However, in practice, this increase in latency may not arise, or be significant. For example, as in FIG. 9, if a read query in a transaction (such as execution of Query1 in block 830) follows a DML statement (such as DML2 execution on the source node 804 in block 822) in the same transaction, then, there is a good chance, in the course of normal execution, that the replicated DML statement will be replayed at the replica node 808 (in block 826) while the query Query1 is being executed at the source node 804 in block 830. Also, in many typical client/server database application models, after executing a DML statement in a transaction, the DML execution result is provided to a client (not shown) via a network call. Since this client/server communication can be overlapped with the network communication between the source node 804 and the replica node 808, the replicated DML statement may have already been replayed at the replica node 808 by the time of the precommit processing in blocks 846, 850, 854, 860.

In the above-described scenario in which the execution result of a DML statement is acknowledged to the client after execution (and before transaction commit), as a consequence of asynchronous DML replication, an error during DML replay at the replica node 808 could be detected after the completion of a DML operation at the source node 804 had already been acknowledged to the client. However, because, at the latest, the error will be detected before committing the transaction, the transaction can be safely rolled back if an error occurs during its replay at the replica node 808.

Figure 10A:
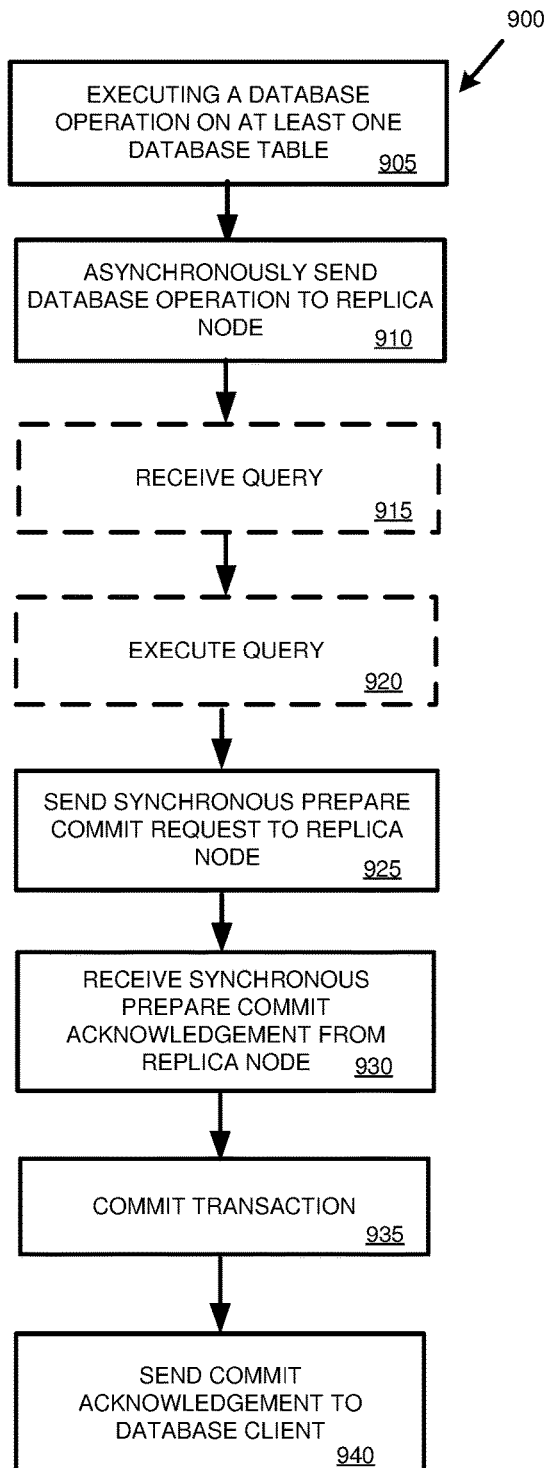
FIG. 10A is a flowchart of an example method involving a source node for performing replication within a database environment from the source node to a replica node, in which one or more database operations of a transaction are asynchronously sent to the replica node, and synchronous communications between the source node and the replica node are used to precommit the transaction at the replica node.

FIG. 10A presents a flowchart for a method 900 of actions occurring at a source node according to an implementation of this Example 5. In the method 900, one or more database operations of a transaction are asynchronously sent by the source node to the replica node, and synchronous communications between the source node and the replica node are used to precommit the transaction at the replica node.

With reference to FIG. 10A, in step 905, the source node executes a database operation on at least one database table maintained by the source node. As used herein, the term database table indicates any portion of a database, however organized. The database operation may be, for example, a DML statement associated with a transaction. The method 900 may be applied to source nodes that maintain a plurality of tables. Similarly, the method 900 may be applied to transactions that include a plurality of database operations, or which include one or more queries before and/or after database operations.

In step 910, the source node asynchronously sends the database operation, such as a DML statement, to a replica node. The replica node replicates at least one table of the source node, but may replicate multiple tables of the source node. In addition, the database system may include multiple source nodes, and the replica node may replicate one or more tables from a first source node and one or more tables from a second source node. For any additional database operations in the transaction, the source node can iteratively repeat steps 905 and 910.

In optional step 915, the source node receives a query in the same transaction as the database operation. In one example, the query is received from a database client. In another example, the query is received from the replica node. For example, the query may be sent by the client to the source node, rather than the replica node, when the client determines that the query will access a table changed in the same transaction as the query. Similarly, the query may be sent to the source node by the replica node, such as when the replica node determines that the query will access a table changed within the same transaction as the query. Or, the replica node may first delay execution of the query at the replica node pending the execution of the DML statements upon which the query depends, and then forward the query to the source node if the delay exceeds a predetermined threshold time.

In optional step 920, if a query was received by the source node (a query that accesses a table changed by the same transaction as the query, e.g. reading a result of a database operation in the transaction), the source node executes the query.

The source node, in step 925, sends a synchronous request to the replica node to prepare to commit the transaction. In step, 930, the source node receives a synchronous precommit acknowledgement from the replica node, indicating that the transaction was precommitted at the replica node, such as indicating that DML statements in the transaction were successfully executed at the replica node.

The source node commits the database operation in step 935. In step 940, after committing the transaction at the source node, the source node acknowledges the commit to a database client.

In particular examples (see, e.g., Examples 6 and 7, below), after committing the transaction at the source node, the source node provides the acknowledgement to the database client without waiting for a confirmation from the replica node that the transaction was committed by the replica node. For example, the source node may, after committing the transaction at the source node, but before or after sending the commit acknowledgement to the client, send an asynchronous commit request to the replica node. In such examples, before providing the acknowledgement to the database client, the source node does wait for a confirmation from the replica node that the transaction was committed by the replica node.

In other examples (e.g., as in the protocol 800 of FIG. 9), the acknowledgement to the client is sent after the source node receives a commit acknowledgement from the replica node. For example, after committing the transaction at the source node, the source node may send a synchronous commit request to the replica node and commit the transaction after receiving a synchronous commit acknowledgement from the replica node.

Figure 10B:
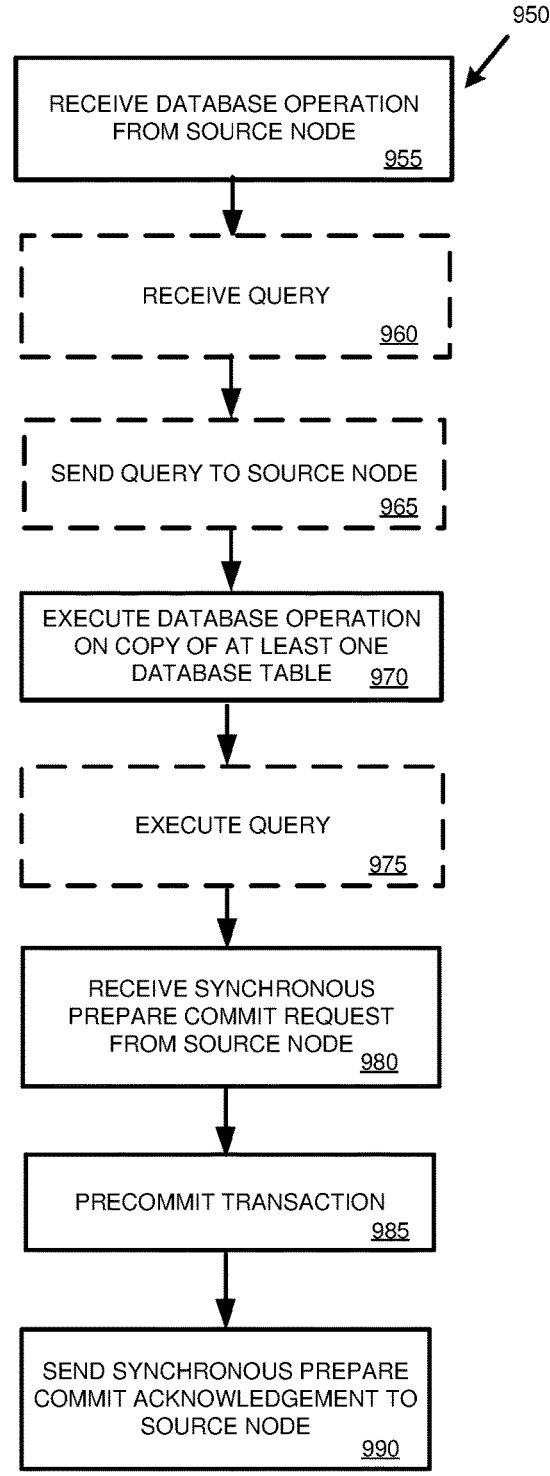
FIG. 10B is a flowchart of an example method involving a replica node for performing replication within a database environment from a source node to the replica node, in which one or more database operations of a transaction asynchronously sent by the source node are received by the replica node, and synchronous communications between the source node and the replica node are used to precommit the transaction at the replica node.

FIG. 10B provides a flowchart of a method 950 representing actions occurring at a replica node during at least certain implementations of this Example 5. In the method 950, one or more database operations of a transaction asynchronously sent by the source node are received by the replica node, and synchronous communications between the source node and the replica node are used to precommit the transaction at the replica node.

In step 955, the replica node receives a database operation sent asynchronously from a source node. For example, the database operation may be a DML statement from a transaction that includes one or more database operations (e.g., DML statements) and, optionally, one or more queries before and/or after database operations.

In optional step 960, the replica node receives a query in the transaction, such as from a database client, where the query accesses a table changed by the same transaction as the query. In a particular implementation, the replica node checks whether the query reads a result of the database operation in the same transaction and, if so, sends the query to the source node in optional step 965. For example, the replica node may forward the query to the source node when the replica node determines that the query accesses a table changed in the same transaction as the query. In another example, the replica node checks whether the query reads a result of the database operation in the same transaction and, if so, first delays execution of the query pending execution of the database operation(s) (e.g., DML statement(s)) in the transaction whose results will be accessed by the query. If the delay exceeds a predetermined threshold time, the replica node sends the query to the source node in optional step 965.

The replica node executes the database operation, such as a DML statement, on the copy (replica) of the at least one database table, in step 970. For any additional database operations in the transaction, the replica node can iteratively repeat steps 955 and 970. In optional step 975, the replica node executes a query in the same transaction as the database operation(s), such as a query whose execution was delayed (after checking whether the query reads a result of the database operation) pending the execution of the database operation in step 970.

In step 980, the replica node receives a synchronous precommit request from the source node. The replica node precommits the transaction in step 985, e.g., writing the database operation(s) of the transaction to a precommit log in persistent storage. The transaction can be marked as "in-doubt" as part of the precommitting by the replica node. In another implementation, in step 985, the transactions are marked "in-doubt" at the replica node, but the transaction is not written to a precommit log in persistent storage.

In step 990, the replica node sends a synchronous precommit acknowledgement to the source node, indicating that the transaction was successfully precommitted by the replica node, including, for example, indicating that a DML statement in a transaction was successfully executed by the replica node.

The method 950 may include additional steps. In one implementation, the replica node receives an asynchronous commit request or commit notification from the source node. The replica node commits the database operation, such as a transaction including one or more DML statements, after receiving the commit request. For example, the replica node writes a commit log for the transaction to persistent storage and marks the transaction as committed.

In another implementation, the replica node receives a synchronous commit request or commit notification from the source node. The replica node commits the transaction. For example, the replica node writes a commit log for the transaction to persistent storage and marks the transaction as committed. After the transaction is committed, the replica node sends a synchronous commit acknowledgement to the source node, indicating that the transaction was successfully committed by the replica node.

Example 6—Optimistic Commit at Replica Node

When replication is used for "high-availability data" purposes, traditional two-phase commit, or a strict synchronization of the persistent storage of the source and replica nodes at the time of commit, would typically be used. This is because, in high-availability data applications, a replica node should be able to continue to service client read requests, and potentially write requests, even if the source node becomes unavailable. However, when table replication is used for other purposes, such as for load-balancing (FIG. 5B), an optimistic approach can be used because the commit of the source transaction can be decided without fully waiting for log persistency I/O at the replica node. In some implementations, the optimistic approach to committing transactions can be selectively enabled (turned on or off) depending on whether table replication is used for high-availability data (optimistic commit mode off) or load balancing (optimistic commit mode on).

For example, even if the replica node crashes before writing its commit logs to persistent storage, it can simply re-synchronize with the source table at the source node upon reactivation, because the committed logs have been safely written at the source node before the transaction commit.

Figure 11:
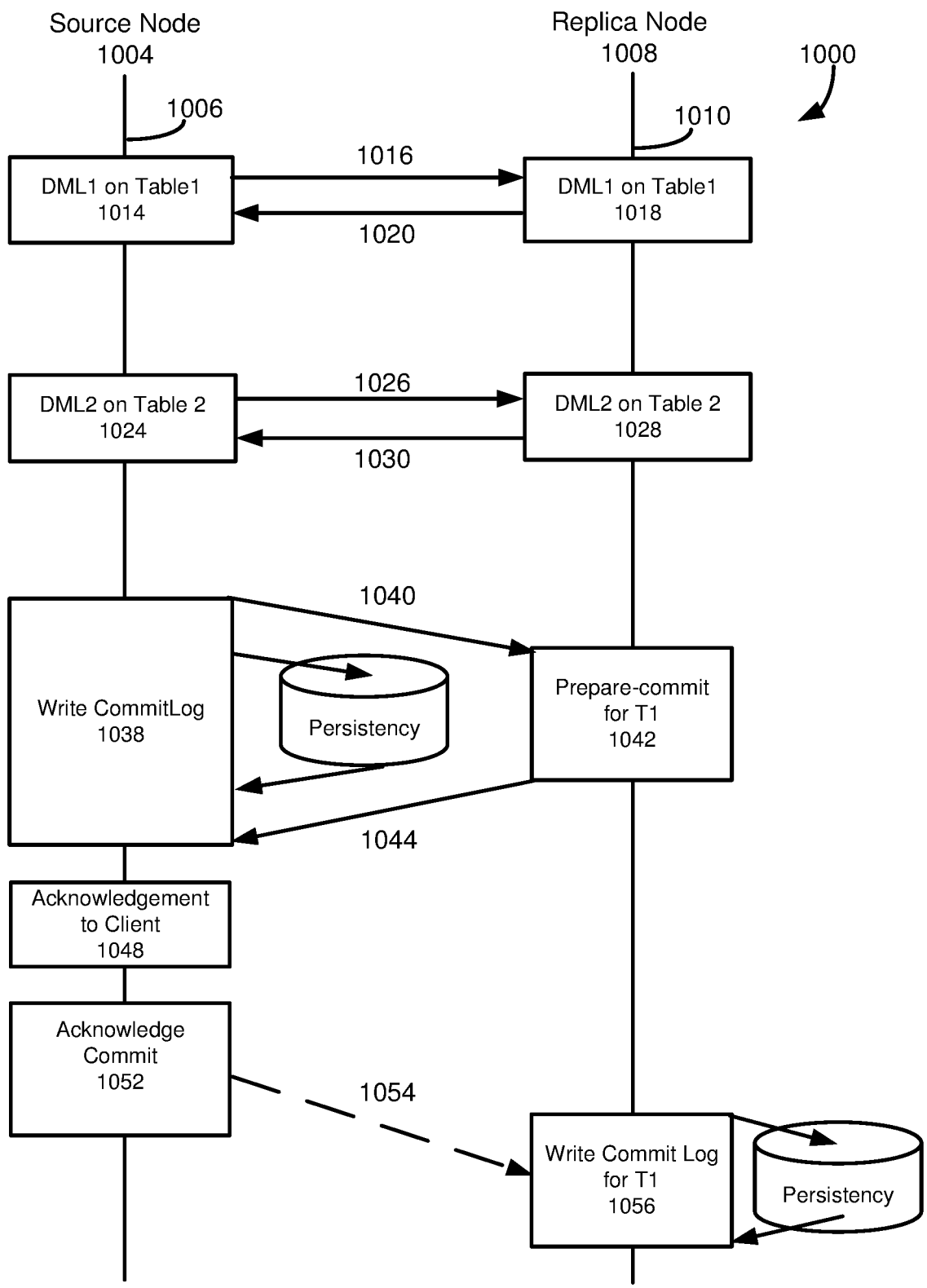
FIG. 11 is a diagram of a database protocol in which one or more database operations for a transaction are replicated from a source node to a replica node, and the transaction is acknowledged to a database client as committed without the source node waiting to receive a commit acknowledgement from the replica node.

This optimistic commit protocol is described with reference to the protocol 1000 of FIG. 11. In the protocol of FIG. 11, one or more database operations for a transaction are replicated from a source node to a replica node, and the transaction is acknowledged to a database client as committed without the source node waiting to receive a commit acknowledgement from the replica node. As shown, the protocol 1000 can follow a typical synchronous replication protocol, in which a source node 1004 and a replica node 1008, having respective execution timelines 1006, 1010, are synchronized after every DML statement. However, if desired, the optimistic commit protocol of this Example 6 can be used with other DML replication schemes. For example, the optimistic commit protocol of this Example 6 can be combined with the asynchronous DML replication protocol of Example 5. Such a combination is described below in Example 7.

The source node 1004 and replica node 1008 execute one or more database operations of a transaction. For example, as shown in FIG. 11, DML statements DML1 and DML 2, on Tables 1 and 2, respectively, for a transaction T1 are executed at the source node 1004 in blocks 1014, 1024. The DML statements are sent synchronously from the source node 1004 to the replica node 1008 in communications 1016 and 1026, respectively. DML1 is executed at the replica node 1008 in process 1018. DML2 is executed at the replica node 1008 in block 1028. After execution of DML1 and DML2 at the replica node 1008, the replica node 1008 sends synchronous acknowledgments to the source node 1004 in communications 1020 and 1030, respectively.

When the transaction T1 is to be committed, in block 1038, the source node 1004 prepares the replica 1008 to commit the transaction by sending a synchronous precommit request 1040. After receiving the precommit request 1040, the replica node 1008 prepares the transaction for precommittment in block 1042, including marking the transaction as "in-doubt" at the replica node 1008. In some implementations, the block 1042 can include writing a precommit log to persistent storage. After block 1042, the replica node 1008 sends a synchronous precommit acknowledgement 1044 to the source node 1004.

While the precommit request 1040 is being sent, and the replica node 1008 is precommitting the transaction in block 1042, the source node 1004 continues with committing the transaction in block 1038. That is, the I/O overhead associated with the commit process 1038 (for persistency operations at the source node 1004) is overlapped with the network overhead of the synchronous precommit request 1040, optionally the precommit I/O overhead of the precommit process of the replica node 1008 in block 1042 (for local persistency operations at the replica node 1008), and the network overhead of the synchronous precommit acknowledgement 1044.

If desired, communications between the source node 1004 and the replica node 1008 can be grouped to further reduce the effect of network communications on the time needed to commit transactions at the source host 1004, or to precommit or commit transactions on the replica node 1008. For example, concurrent precommit requests 1040 can be grouped by the source node 1004 into a single physical network call. Similarly, precommit acknowledgements 1044 from the replica node 1008 can be grouped into a single physical network call.

After the source node 1004 has committed the transaction in block 1038, and received the precommit acknowledgement 1044 from the replica node 1008, the source node 1004 acknowledges the commit to the client (not shown) in block 1048. Subsequently, in block 1052, the source node 1004 sends an asynchronous commit request 1054 to the replica node 1008. When the asynchronous commit request 1054 is received by the replica node 1008, the replica node 1008, in block 1056, writes a commit log for the transaction, including writing the commit log to persistent storage and marking the transaction as "committed" at the replica node 1008. In other implementations, the asynchronous commit request 1054 is sent by the source node 1004 before, or in parallel with, providing the commit acknowledgement to the client in block 1048.

Compared with the system using the protocol 700 of FIG. 8, or the system using the protocol 800 of FIG. 9, the system using the protocol 1000 of FIG. 11 provides earlier acknowledgment of the transaction commit to the client, as it occurs without the roundtrip communication and log persistency delays incurred in the final synchronous commit phase by the protocols 700 and 800. Once the transaction is committed by the source node 1004, the changes are available for readers accessing the source node 1004. The changes may be accessed at the replica node 1008 after they are committed by the replica node 1008.

As discussed above, the transactions at the replica node 1008 are marked as in-doubt as a result of the precommit process 1042. If the transaction were to be committed at the source node 1004 without marking the replica-side transaction as in-doubt, there is chance that a query (outside the transaction) which was started at the replica node 1008 right after the transaction is committed at the source node 1004 may not see the result of the transaction at the replica side. A suitable visibility scheme that may be used with this Example 6 is described in Example 4.

In the protocol 1000 of FIG. 11, if a query (outside the transaction) is received by the replica node 1008 before precommit processing is started at the replica node 1008, the changes of database operations such as DML1 and DML2 are not visible to the query because their corresponding transaction status is still marked as active. (This scenario is different than handling same-transaction queries as in Example 5, where a query at the replica node is first checked to determine whether it will access a table changed in the same transaction as the query. If so, the query can be sent to the source node, or execution delayed at the replica node until the corresponding database operations (e.g., DML statements) have been executed at the replica node.)

In the example of FIG. 11, for a query outside the current transaction, which is received at the replica node 1008, and which accesses the modified records of the current transaction, the replica node 1008 will wait until the status of the transaction is changed from active or in-doubt (for the current transaction) to committed or aborted, then execute the query (outside the current transaction) instead of reading potentially outdated data. Or, if the replica node 1008 determines that the query (outside the current transaction) will access records that are marked as in-doubt (for the current transaction), the replica node 1008 may forward the query to the source node 1004 for execution, Or, the replica node 1008 may forward query after waiting for a predetermined threshold time for the transaction to become committed or aborted.

Figure 12:
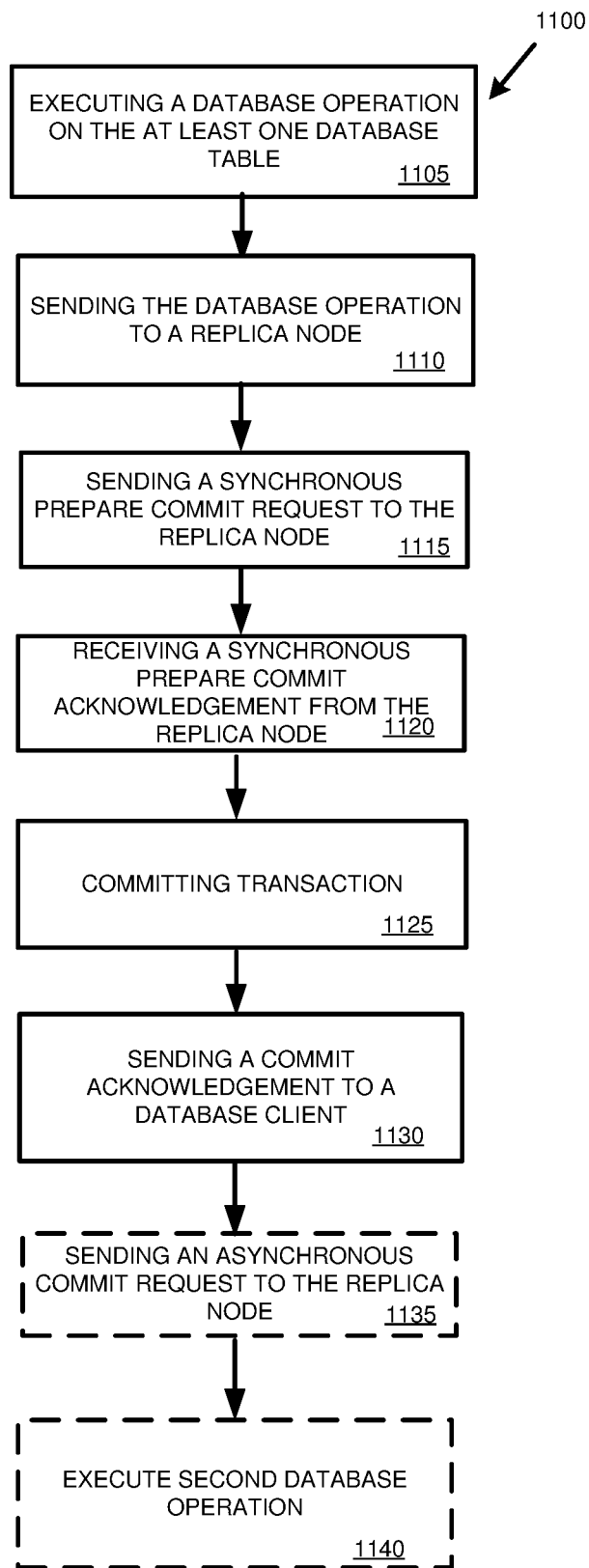
FIG. 12 is a flowchart of an example method involving a source node for performing replication within a database environment from the source node to a replica node, in which a transaction is acknowledged to a database client as committed without the source node waiting to receive a commit acknowledgment from the replica node.

FIG. 12 provides a flowchart of a method 1100 describing actions occurring at a source node according to an implementation of this Example 6. In the method 1100, one or more database operations of a transaction are replicated within a database environment from a source node to a replica node, and the transaction acknowledged to a database client as committed without the source node waiting to receive a commit acknowledgment from the replica node.

In step 1105, at least one database operation is executed on at least one database table maintained by the source node. As used herein, the term database table indicates any portion of a database, however organized. For example, the database operation can be a DML statement in a transaction that includes one or more DML statements. The transaction can also include one or more queries. In some examples, the source node maintains a plurality of tables, and one or more of the tables may be replicated to one or more replica nodes. In some cases, all of the replica nodes replicate the same table or tables of the source node. In other cases, different replica nodes replicate different source node tables.

In step 1110, the source node sends the database operation to a replica node. For example, the source node synchronously sends the database operation to the replica node. In this case, the source node awaits acknowledgement that the replica node has executed the database operation before continuing by executing the next database operation or precommitting the database operation(s). For any additional database operations in the transaction, the source node can iteratively repeat steps 1105 and 1110.

The source node, in step 1115, sends a synchronous precommit request to the replica node. The replica node performs precommit operations (e.g., as described above with reference to FIG. 11) then sends a synchronous precommit acknowledgement to the source node. The source node receives the synchronous precommit acknowledgement from the replica node in step 1120.

The transaction is committed by the source node in step 1125, e.g., as described above with reference to FIG. 11. In step 1130, after committing the transaction at the source node, the source node sends a commit acknowledgement to a database client acknowledging commitment of the transaction.

In optional step 1135, after committing the transaction at the source node, the source node sends an asynchronous commit request to the replica node. Although FIG. 12 shows step 1135 occurring after step 1130, in at least some examples, step 1135 may occur before, or in parallel with, step 1130. In such examples, before providing the acknowledgement to the database client, the source node does wait for a confirmation from the replica node that the transaction was committed by the replica node.

In optional step 1140, a second database operation is executed by the source node, such as a database operation that accesses records changed by the previously committed database operation. For example, the second database operation may be executed without the source node receiving a commit notification from the replica node.

Figure 13:
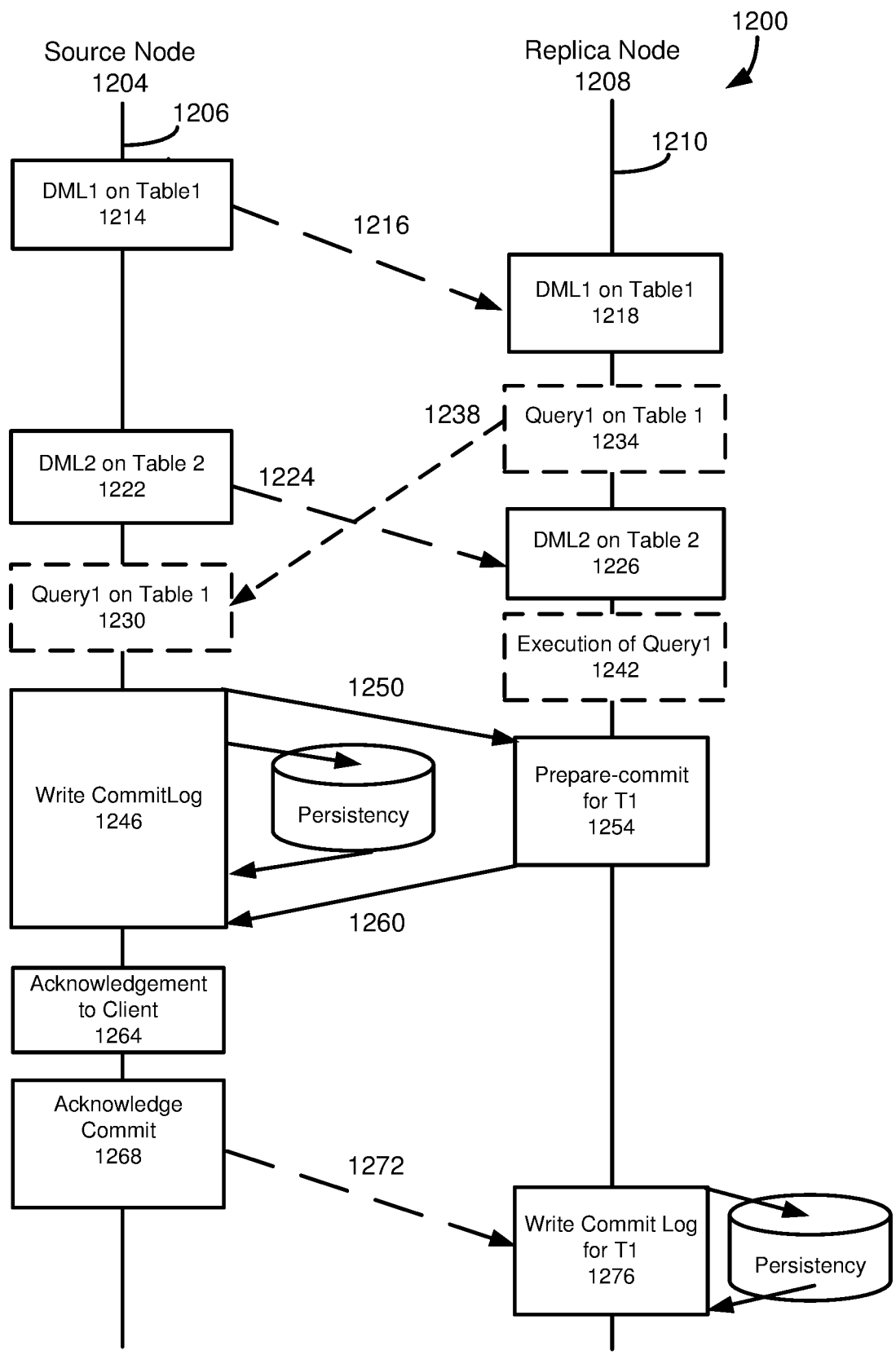
FIG. 13 is a diagram of a database protocol in which one or more database operations for a transaction are replicated from a source node to a replica node, with the database operation(s) being asynchronously sent from the source node to the replica node, synchronous communications between the source node and the replica node to precommit the transaction at the replica node, and the transaction being acknowledged to a database client as committed without the source node waiting to receive a commit acknowledgement from the replica node.

Example 7—Replication with Synchronization of DML Operations Upon Commit Initiation at Source Node and Optimistic Commit at Replica Node If desired, the protocols of Examples 5 and 6 can be combined, as shown in the protocol 1200 of FIG. 13. The system that implements the protocol 1200 includes a source node 1204 and a replica node 1208, with respective execution timelines 1206, 1210.

In process 1214, the DML statement DML1 on Table 1 is executed at the source node 1204 and then asynchronously sent to the replica node 1208 in communication 1216. In block 1218, DML1 is executed on the replica node 1208. Another DML statement DML2 on Table 2 is executed at the source node 1204 in block 1222, and then asynchronously sent to the replica node 1208 in communication 1224. DML2 is executed at the replica node 1208 in process 1226.

In optional block 1230, Query1, part of the same transaction as DML1 and DML2, is carried out at the source node 1204. As described above with respect to Example 5, in some cases, Query1 is received by the source node 1204 directly from a database client. In other examples, Query1 is forwarded to the source node 1204 by the replica node 1208. For example, the replica node 1208 receives Query1 in optional block 1234. In some cases, the replica node 1208 forwards the query to the source node 1204, such as in optional communication 1238, when the replica node 1208 determines that the query will access tables modified in the same transaction as the query. In other examples, the query may be first held by the replica node 1208 pending the execution by the replica node 1208 of the DML statements upon which the query depends in the same transaction. Upon execution of the DML statements by the replica node 1208, the replica node 1208 may process the query, such as in optional process 1242. In other examples, if the query is pending at the replica node 1208 for a time exceeding a predetermined threshold, the query is forwarded to the source node 1204 by the replica node 1208 in optional communication 1238. The source node 1204 then executes the same-transaction query in optional block 1230.

The predefined threshold may depend on a particular implementation and can be, for example, about 0.1 milliseconds, about 0.25 milliseconds, about 0.5 milliseconds, about 0.75 milliseconds, about 1 millisecond, about 1.5 milliseconds, about 2 milliseconds, about 5 milliseconds, about 10 milliseconds, or about 50 milliseconds, such as being 0.1 milliseconds, 0.25 milliseconds, 0.5 milliseconds, 0.75 milliseconds, 1 millisecond, 1.5 milliseconds, 2 milliseconds, 5 milliseconds, 10 milliseconds, or 50 milliseconds. In further implementations, the predefined threshold is between about 0.05 milliseconds and about 50 milliseconds, between about 0.1 milliseconds and about 10 milliseconds, between about 0.25 milliseconds and about 5 milliseconds, between about 0.5 milliseconds and about 2.5 milliseconds, or between about 0.1 milliseconds and about 1 millisecond, such as being between 0.05 milliseconds and 50 milliseconds, between 0.1 milliseconds and 10 milliseconds, between 0.25 milliseconds and 5 milliseconds, between 0.5 milliseconds and 2.5 milliseconds, or between 0.1 milliseconds and 1 millisecond. In other implementation, the predefined threshold has some other value.

The protocol 1200 can provide improved processing of queries, and DML statements, because database operations are propagated asynchronously. For example, the source node 1204 can execute DML2 without waiting for DML1 to be synchronized with the replica node 1208. Similarly, Query1 can be executed by the source node 1204 without waiting for synchronization of DML1 and DML2 with the replica node 1208.

At block 1246, the source node 1204 prepares to commit the transaction that includes DML1, DML2, and Query1. The source node 1204 sends the replica node 1208 a synchronous prepare commit request in communication 1250. The replica node 1208 precommits the transaction in block 1254, marking the transaction as "in-doubt" at the replica node 1208. In some implementations, block 1254 can including having the replica node 1208 write a precommit log to persistent storage.

The replica node 1208 sends a synchronous precommit acknowledgment to the source node 1204 in communication 1260. During the period where communications 1250, 1260 and the precommit process 1254 are occurring, the source node 1204 writes a commit log in block 1246. Overlapping writing the write log at the source 1204 with the precommit process at the replica node 1208 can help reduce the delays incurred by the replication process.

If desired, communications between the source node 1204 and the replica node 1208 can be grouped to further reduce the effect of network communications on the time needed to commit transactions at the source host 1204, or to precommit or commit transactions on the replica node 1208. For example, concurrent precommit requests 1250 can be grouped by the source node 1204 into a single physical network call. Similarly, precommit acknowledgements 1260 from the replica node 1240 can be grouped into a single physical network call. The asynchronous commit requests 1272 (described below) from the source node 1204 may similarly be grouped to be sent to the replica node 1208.

In block 1264, after the commit process 1246 has completed at the source node 1204, and the source node 1204 has received the synchronous precommit acknowledgement 1260 from the replica node 1208, the source node 1204 acknowledges the commit of the transaction to a client (not shown). In process 1268, the source node 1204 prepares the replica node 1208 to commit the transaction, including by sending an asynchronous commit request in communication 1272. In some examples, block 1268 occurs before, or in parallel with, acknowledging the commit to the client in block 1264.

The replica node 1208 commits the transaction in block 1276, including by writing a commit log to persistent storage and marking the transaction as "committed" at the replica node 1208.

In addition to expediting transaction processing at the source node by not requiring synchronization at every DML transaction, the protocol 1200 also can improve replication performance by including a single synchronization point (the precommit process, communications 1250 and 1260) as part of the transaction commit process. This process also allows the results of the transaction to be made available at the source node 1204 (for queries in the same transaction or outside the transaction) without waiting for the transaction to be fully committed at the replica node 1208. The replicated data can be made available at the replica node 1208, to queries outside the transaction, when the transaction is committed by the replica node 1208. Because the replica node 1208 marks the DML statements as being in-doubt until the transaction is committed, and because queries outside the transaction will not execute on the replica node 1208 if the results of earlier changes in the transaction are not visible, there is no danger of read requests obtaining out of date data from the replica node 1208.

Figure 14A:
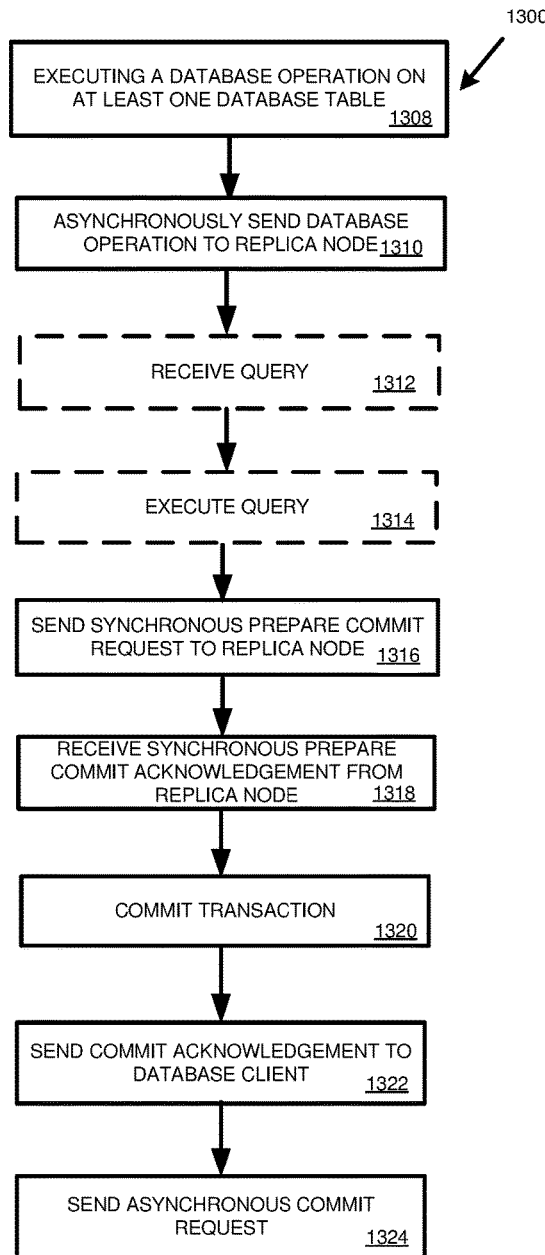
FIG. 14A is a flowchart of an example method involving a source node for performing replication within a database environment from the source node to a replica node, with one or more database operations being asynchronously sent from the source node to the replica node, synchronous communications between the source node and the replica node to precommit a transaction at the replica node, and the transaction being acknowledged to a database client as committed without the source node waiting to receive a commit acknowledgement from the replica node.

FIG. 14A presents a flowchart for a method 1300 of actions occurring at a source node according to an implementation of this Example 7. In the method 1300, one or more database operations of a transaction are asynchronously sent from the source node to the replica node, synchronous communications between the source node and the replica node are used to precommit a transaction at the replica node, and the transaction is acknowledged to a database client as committed without the source node waiting to receive a commit acknowledgement from the replica node.

In step 1308, the source node executes a database operation on at least one database table maintained by the source node. As used herein, the term database table indicates any portion of a database, however organized. The database operation may be, for example, a DML statement associated with a transaction. The method 1300 may be applied to source nodes that maintain a plurality of tables. Similarly, the method 1300 may be applied to transactions that include a plurality of database operations, or which include one or more queries before and/or after database operations.

In step 1310, the source node asynchronously sends the database operation, such as a DML statement, to a replica node. The replica node replicates at least one table of the source node, but may replicate multiple tables of the source node. In addition, the database system may include multiple source nodes, and the replica node may replicate one or more tables from a first source node and one or more tables from a second source node. For any additional database operations in the transaction, the source node can iteratively repeat steps 1305 and 1310.

In optional step 1312, the source node receives a query in the same transaction as the database operation. In one example, the query is received from a database client. In another example, the query is received from the replica node. For example, the query may be sent by the client to the source node, rather than the replica node, when the client determines that the query will access a table changed in the same transaction as the query. Similarly, the query may be sent to the source node by the replica node, such as when the replica node determines that the query will access a table changed within the same transaction as the query. Or, the replica node may first delay execution of the query at the replica node pending the execution of the DML statements upon which the query depends, and then forward the query to the source node if the delay exceeds a predetermined threshold time.

In optional step 1314, if a query was received by the source node (a query that accesses a table changed by the same transaction as the query, e.g. reading a result of a database operation in the transaction), the source node executes the query.

The source node, in step 1316, sends a synchronous request to the replica node to prepare to commit the transaction. In step, 1318, the source node receives a synchronous precommit acknowledgement from the replica node, indicating that the transaction was precommitted at the replica node, such as indicating that DML statements in the transaction were successfully executed at the replica node.

The source node commits the database operation in step 1320. In step 1322, after committing the transaction at the source node, the source node acknowledges the commit to a database client.

In particular examples, after committing the transaction at the source node, the source node provides the acknowledgement to the database client without waiting for a confirmation from the replica node that the transaction was committed by the replica node. For example, the source node may, after sending the commit acknowledgement to the client, send an asynchronous commit request to the replica node in step 1324. Although step 1324 is shown as occurring after providing the acknowledgement to the database client in step 1322, in other examples, step 1324 may occur before, or in parallel with, step 1322.

Figure 14B:
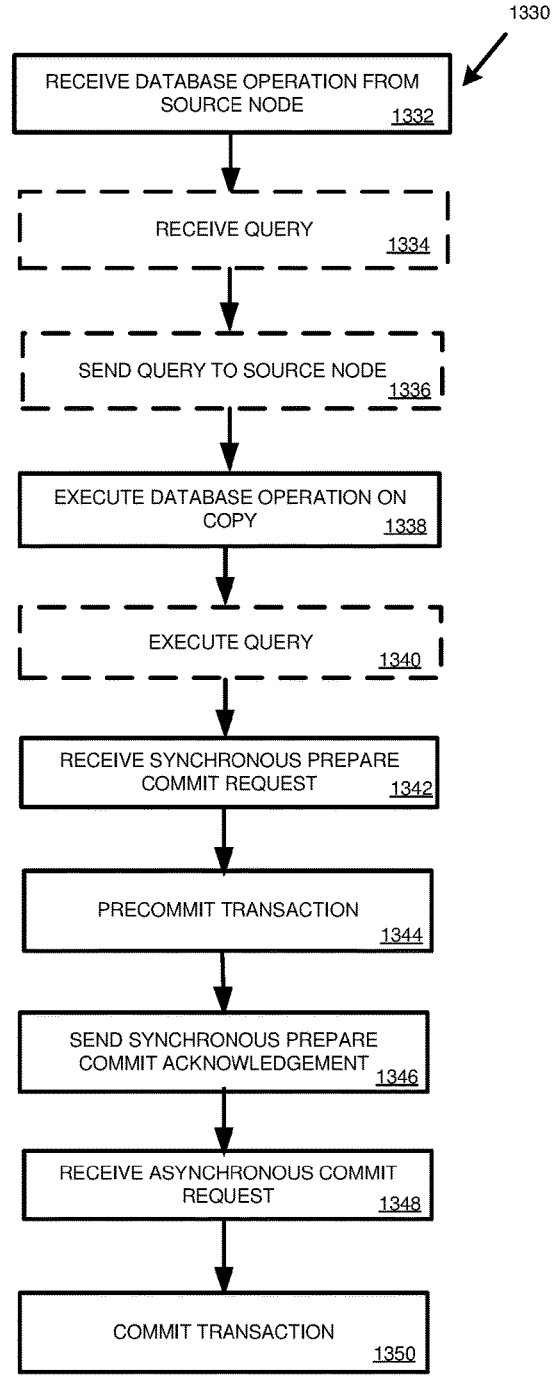
FIG. 14B is a flowchart of an example method involving a replica node for performing replication within a database environment from a source node to the replica node, with one or more database operations being asynchronously sent from the source node to the replica node, synchronous communications between the source node and the replica node to precommit a transaction at the replica node, and the transaction being acknowledged to a database client as committed without the source node waiting to receive a commit acknowledgement from the replica node.

FIG. 14B provides a flowchart of a method 1330 representing actions occurring at a replica node during at least certain implementations of this Example 7. In the method 1330, one or more database operations asynchronously sent from the source node to the replica node are received by the replica node, synchronous communications between the source node and the replica node are used to precommit the transaction at the replica node, and the transaction is acknowledged to a database client as committed without the source node waiting to receive a commit acknowledgement from the replica node.

In step 1332, the replica node receives a database operation sent asynchronously from a source node. For example, the database operation may be a DML statement from a transaction that includes one or more database operations (e.g., DML statements) and, optionally, one or more queries before and/or after database operations.

In optional step 1334, the replica node receives a query in the transaction, such as from a database client, where the query accesses a table changed by the same transaction as the query. In a particular implementation, the replica node checks whether the query reads a result of the database operation in the same transaction and, if so sends the query to the source node in optional step 1336. For example, the replica node may forward the query to the source node when the replica node determines that the query accesses a table changed in the same transaction as the query. In another example, the replica node checks whether the query reads a result of the database operation in the same transaction and, if so, first delays execution of the query pending execution of the database operation(s) (e.g., DML statement(s)) in the transaction whose results will be accessed by the query. If the delay exceeds a predetermined threshold time, the replica node sends the query to the source node in optional step 1336.

The replica node executes the database operation, such as a DML statement, on the copy (replica) of the at least one database table, in step 1338. For any additional database operations in the transaction, the replica node can iteratively repeat steps 1332 and 1338. In optional step 1340, the replica node executes a query in the same transaction as the database operation(s), such as a query whose execution was delayed (after checking whether the query reads a result of the database operation) pending the execution of the database operation in step 1338.

In step 1342, the replica node receives a synchronous precommit request from the source node. The replica node precommits the transaction in step 1344, e.g., marking the transaction as "in-doubt" as part of the precommitting by the replica node. In some implementations, step 1344 can include writing the database operation(s) of the transaction to a precommit log in persistent storage of the replica node. In step 1346, the replica node sends a synchronous precommit acknowledgement to the source node, indicating that the transaction was successfully precommitted by the replica node, including, for example, indicating that a DML statement in a transaction was successfully executed by the replica node.

In step 1348, the replica node receives an asynchronous commit request from the source node. The replica node commits the database operation in step 1350. For example, the replica node writes a commit log for the transaction to persistent storage and marks the transaction as committed.

Example 8—Maintaining Cross-Table Transactional Consistency on Re-Activation of Table Replication Certain Examples of the present disclosure can involve synchronizing a replica system with a source system after replication, such as synchronous table replication with optimistic commit at a replica node, as described in Example 6, has been activated or reactivated. For example, in some situations, table replication may be manually deactivated (such as to perform maintenance) and subsequently reactivated, or may be restarted due to an exception occurring during table replication.

Figure 15:
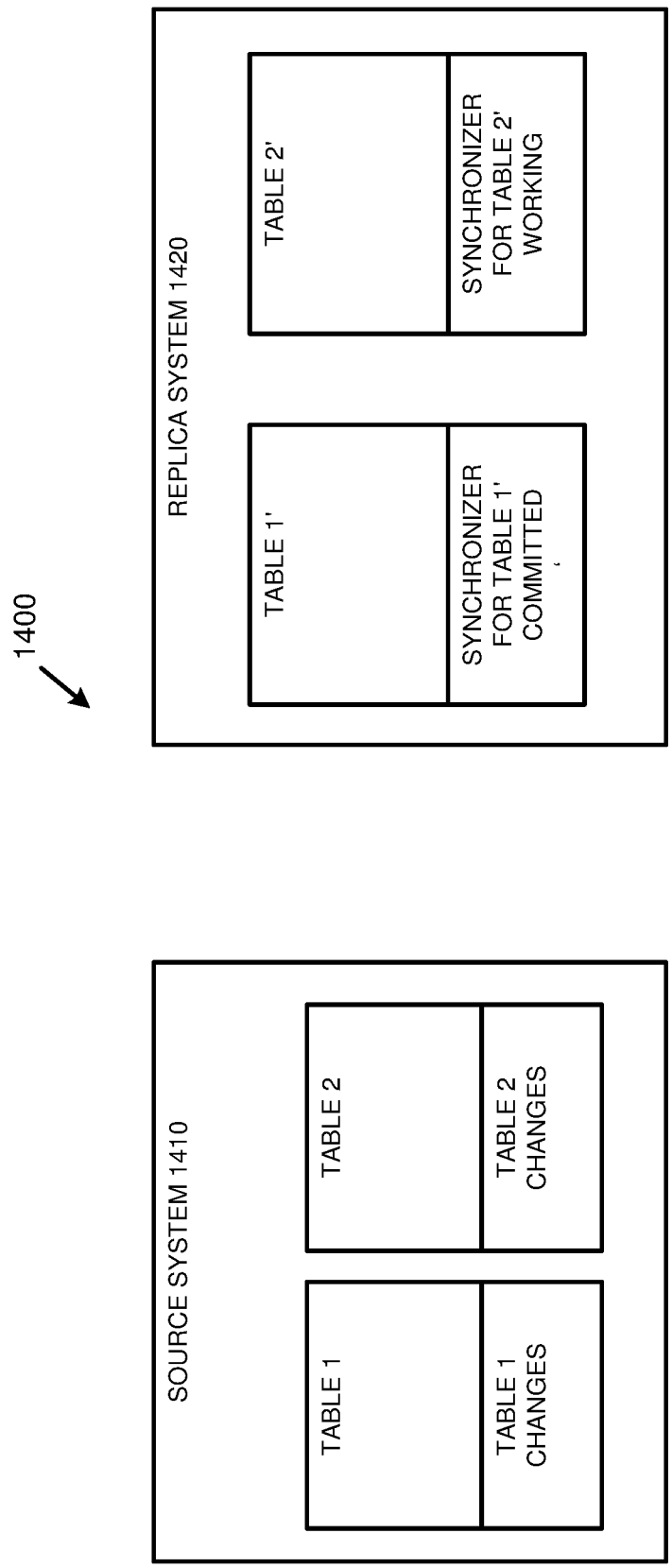
FIG. 15 is diagram depicting a database environment for synchronizing database tables maintained at a source system with copies of the database tables maintained at a replica system.

FIG. 15 illustrates a potential problem that can develop if tables are allowed to reactivate incrementally on a table-by-table basis. FIG. 15 illustrates a system 1400 having a source system 1410 that contains Tables 1 and 2 and a replica system 1420 that contains copies of Tables 1 and 2, which are being incrementally synchronized. In the source system 1410, changes to Table 1 and Table 2 have accumulated after synchronization was deactivated. Replica system 1420 shows that the synchronizer for Table 1 has finished committing the changes to Table 1', but the synchronizer for Table 2' is still working. If replica system 1420 is accessed at this point, a join operation between Table 1' and Table 2' can return inconsistent data (compared to the same join operation between Table 1 and Table 2 at the source system 1410).

FIG. 16A provides a flowchart of an example method 1500 for assisting in maintaining consistency in read operations received by a replica system during resynchronization following activation or reactivation of table replication. In step 1510, replication log replay, such as the processes described in Examples 1-7, is blocked. In a particular implementation, log entries continue to be generated by the source system, and may be sent to the replica system, even though the log entries are blocked from being replayed by the replica system.

To address this problem of potential inconsistencies during a reactivation period, the source system and the replica system can reactivate tables with a single internal transaction. In this way, the changes applied during reactivation can become visible at the same time, for all of the replicated tables.

In a parallel, multi-threaded process, each table in the source node is locked in step 1515. In step 1520, in a parallel, multi-threaded process, replication log generation is reactivated at each source table. The source tables are unlocked in step 1525, in a parallel, multi-threaded process. A snapshot timestamp is acquired in step 1530. The order of steps 1525 and 1530 may be reversed in some implementations of the method 1500.

In step 1535, the replica tables are selectively synchronized with the source tables. As described above, during this process, replica logs may be generated by the source node(s) and, if desired, sent to the appropriate replica node(s). However, the replica logs are not yet replayed.

Synchronization may be carried out in any suitable manner. In one specific example, synchronization is carried out by comparing the row-IDs values (as described in Example 3) of each source table and its replica table. If a row-ID value is present in the source table, but not in the replica table, the record is copied to the replica table. If the row-ID value is present in the replica table, but not in the source table, the record having that row-ID value is removed from the replica table. If the row-ID value is present in the source table and the replica table, no action is taken. Synchronization is carried out using the timestamp acquired in step 1530 (e.g., using the timestamp to select which transactions to ignore for replication log replay, and instead recover using synchronization). Thus, for example, records are synchronized between the copies of the tables (replica tables) and the source tables for any transaction having a transaction commit timestamp not later than the synchronization timestamp.

In step 1540, the resumption of replication log replay is initiated at the source host for the copies of the replicated database tables. In various implementations, initiation is carried out by the source system, the replica system, or another system in communication with the replica system.

During replication log replay, the log entry (write logs and transaction commit logs) is only replayed if the timestamp of the operation occurred later than the synchronization timestamp acquired in step 1525. Advantageously, this can help prevent transactions from being carried out multiple times, or missed logs being played even though the synchronization process already made appropriate changes to the replicated table.

FIG. 16B provides a method 1550 of synchronization operations implemented at least in part by the replica host. In step 1555, the replica host receives a synchronization timestamp. The copies of the database tables replicated at the replica host are selectively synchronized with the source database tables, based at least in part on the synchronization timestamp, in step 1560. In step 1565, replication log replay is resumed at the replica host, based at least in part on the synchronization timestamp. For example, the replica host executes an entry of a DML replayer log for any entry having an update timestamp not earlier than the synchronization timestamp or having a corresponding transaction commit timestamp later than the synchronization timestamp. The replica host can also execute any entry of a transaction log for any transaction commit timestamp later than the synchronization timestamp.

As described in method 1550, replica log replay is blocked for the replicated tables until the synchronization process is complete. In at least one implementation, during synchronization, the replicated tables may still receive read requests while synchronization is being carried out. However, the read requests will see the unsynchronized version of the tables, so join operations on different tables will still operate on table versions that are consistent with one another (although they may be out of date compared with data available in the source tables). Once synchronization is complete, join operations will be able to access the synchronized versions of the tables.

Figure 16:
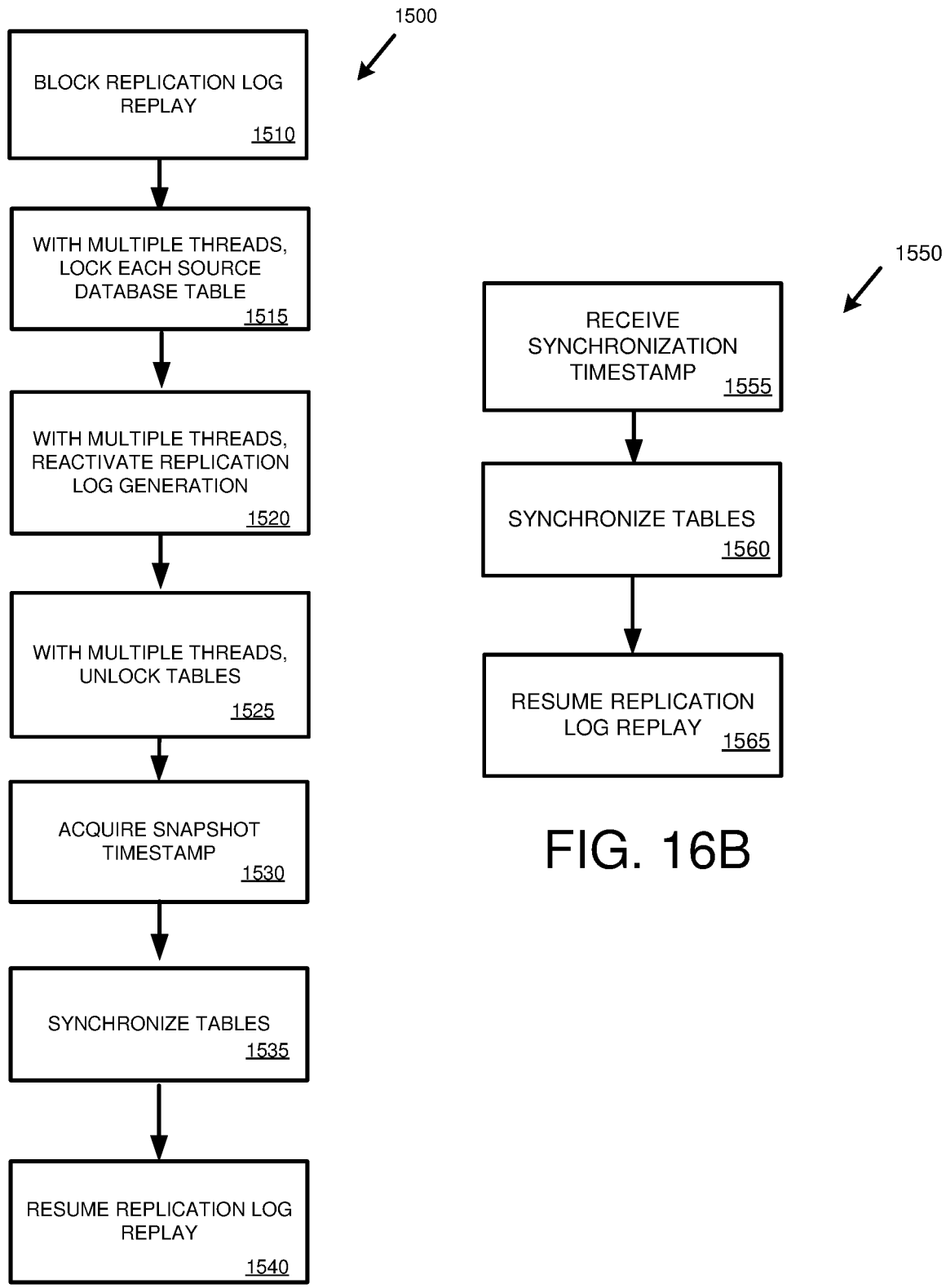
FIG. 16A is a flowchart of an example method involving a source node for synchronizing database tables maintained at a source system with copies of the database tables maintained at a replica node.
FIG. 16B is a flowchart of an example method involving a replica node for synchronizing database tables maintained at a source system with copies of the database tables maintained at a replica node.
Figure 17:
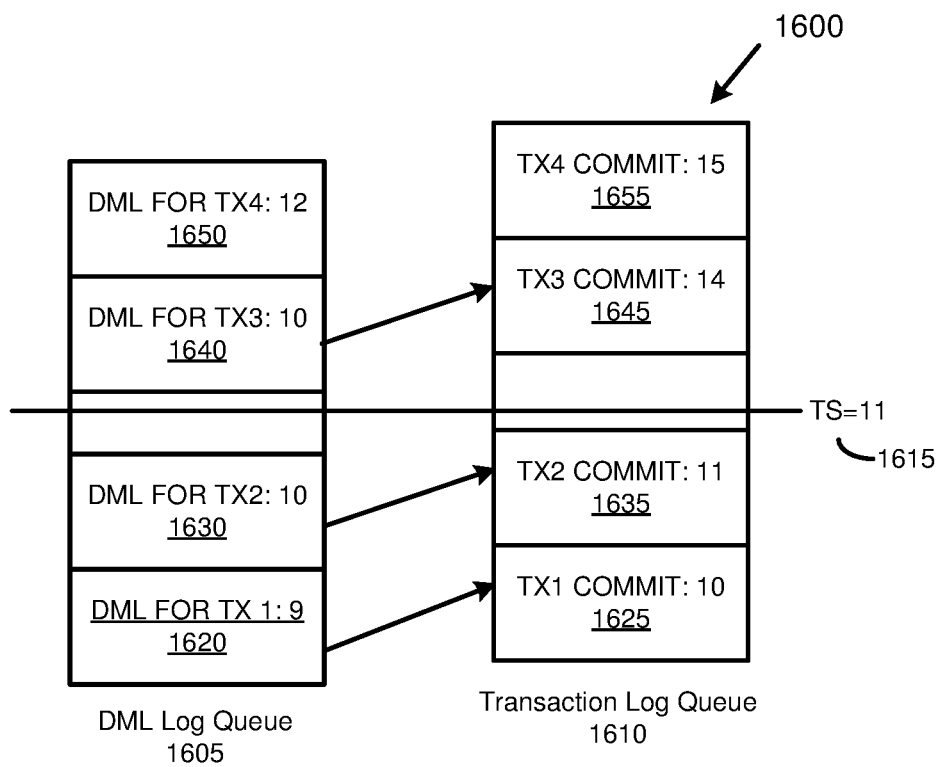
FIG. 17 is a diagram of a replica node illustrating how a synchronization timestamp may be used to determine whether write operations are replayed at the replica node.

FIG. 17 provides a diagram of a system 1600 illustrating DML and transaction log queues 1605, 1610 of a replica node illustrating how the method 1600 of FIG. 17 can assist in avoiding multiple log replay or replay of missed logs. The DML log queue 1605 is shown with multiple DML statements 1620, 1630, 1640, 1650 and the transaction log queue is shown with multiple transaction commit operations 1625, 1635, 1645, 1655. In FIG. 16, the arrows indicate relations between write operations and their corresponding transaction commit operations.

In this example, replica and source tables were synchronized with a timestamp 1615 of 11. In one aspect of the method 1600 of FIG. 17, write operations are replayed if the associated timestamp is greater than or equal to the synchronization timestamp 1615, as those statements will have occurred after synchronization completed. Write operations are also replayed if the timestamp of the commit operation is greater than the synchronization timestamp 1615, even if the timestamp of the write operation itself is less than the synchronization timestamp. Note that, in example implementations, the timestamp of a write operation is always less than the timestamp of its corresponding transaction commit operation.

Write operations 1620 and 1630 will not be replayed since their write timestamps are less than 11 and their commit timestamp is not greater than 11. Write operation 1640 will be replayed even though its write timestamp is less than 11, because the timestamp of its commit operation 1645 is greater than 11. Write operation 1650 will be replayed since its write timestamp is greater than 11. Transaction commit operations are replayed if their timestamps are greater than the synchronization timestamp. In the example of FIG. 17, transaction commit operations for TX entry 1645 and TX 1655 are replayed.

In a specific implementation, if the timestamp of the write operation is less than the synchronization timestamp, the write operation is held until the corresponding commit log is received and analyzed. As described above, if the timestamp of the commit operation is less than the synchronization timestamp, the write operation is not replayed. The write operation is replayed if the commit timestamp is greater than the synchronization timestamp.

In this way, transactions are divided by the synchronizing timestamp. Some updates (earlier updates), are replication by synchronization, while other updates (later updates, or updates from around the time the synchronization timestamp is acquired) are replicated by playback of the replication log. Missed transactions and double playback of transactions are avoided. Further, since the synchronization timestamp in effect defines a single internal transaction, readers see a consistent view of tables (all updated or all not updated).

Example 9—Alternative Scenarios

In many of the examples described above, a single source node replicates a database table with a single replica node. More generally, the protocols described herein can be used for 1-to-n replication between a source node and n replica nodes, where n is 2 or more, each of the n replica nodes storing a copy (replica) of the database table. In some implementations, n is 20, 50, 100, or more nodes. The protocol can also be used for n-to-1 replication, where at least a portion of a distributed source system (such as one or more selected tables, or portions thereof) has multiple source nodes and is replicated to a single replica node. The protocol can also be used with m-n replication, where at least part of a distributed source system (such as one or more selected tables, or portions thereof) are replicated to multiple replica nodes.

In many of the examples described above, a database table is replicated between a source node and replica node. As noted, term database table indicates any portion of a database, however organized. As such, the protocols describes herein can be used for system (database-wide) replication, where the "database table" is in effect the entire database system. Similarly, when the "database table" is a defined section of the entire database system, e.g., one of multiple tables in the database system, the protocols can be applied on a table-by-table basis. In this context, table replication can be selectively applied on a table-by-table basis, such that some tables are replicated while others are not replicated.

In further implementations, the database table may be partitioned, such as being partitioned among multiple source nodes, multiple replica nodes, or multiple source nodes and multiple replica nodes. In some cases, one or both of the source node and the replica node hold a partition of the table, with the other holding the entire table. In other cases, both the source and replica hold partitions of the table, which partitions may be the same or different.

In many of the examples describes above, a source node replicates data with a replica node. The terms "source node" and "replica node" denote roles in the table replication process. Depending on configuration, a given node may be a source node for some table replication operations (e.g., for a first table or set of tables) and a replica node for other table replication operations (e.g., for a second table or set of tables).

Example 10—Computing Systems

Figure 18:
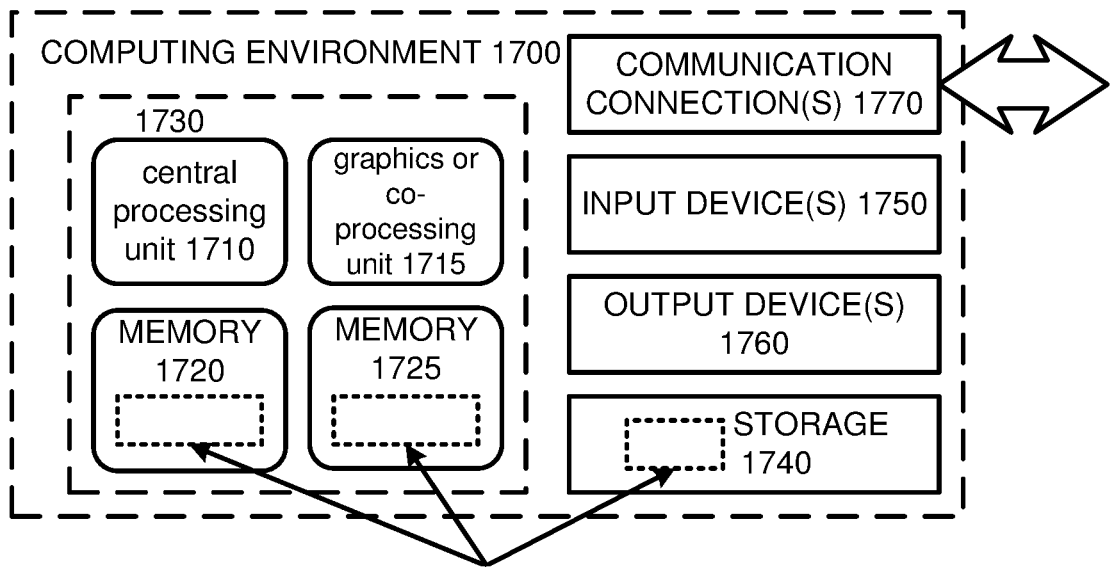
FIG. 18 is a diagram of an example computing system in which some described embodiments can be implemented.

FIG. 18 depicts a generalized example of a suitable computing system 1700 in which the described innovations may be implemented. The computing system 1700 is not intended to suggest any limitation as to scope of use or functionality of the present disclosure, as the innovations may be implemented in diverse general-purpose or special-purpose computing systems.

With reference to FIG. 18, the computing system 1700 includes one or more processing units 1710, 1715 and memory 1720, 1725. In FIG. 18, this basic configuration 1730 is included within a dashed line. The processing units 1710, 1715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 18 shows a central processing unit 1710 as well as a graphics processing unit or co-processing unit 1715. The tangible memory 1720, 1725 may be volatile memory (e.g., registers, cache, RAM), nonvolatile memory (e.g., ROM, EEPROM, flash memory, etc.), or some combination of the two, accessible by the processing unit(s). The memory 1720, 1725 stores software 1780 implementing one or more innovations described herein, in the form of computer-executable instructions suitable for execution by the processing unit(s) 1710, 1715.

A computing system 1700 may have additional features. For example, the computing system 1700 includes storage 1740, one or more input devices 1750, one or more output devices 1760, and one or more communication connections 1770. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing system 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing system 1700. The output device(s)

1760 may be a display, printer, speaker, CD-writer, or another device that provides output from the computing system 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 19:
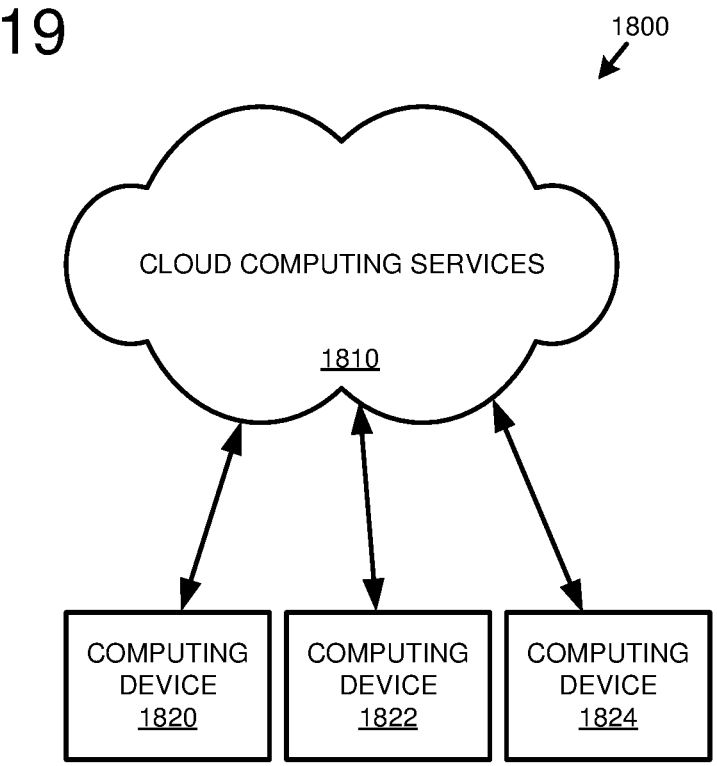
FIG. 19 is an example cloud computing environment that can be used in conjunction with the technologies described herein.

FIG. 19 depicts an example cloud computing environment 1800 in which the described technologies can be implemented. The cloud computing environment 1800 comprises cloud computing services 1810. The cloud computing services 1810 can comprise various types of cloud computing resources, such as computer servers, data storage repositories, networking resources, etc. The cloud computing services 1810 can be centrally located (e.g., provided by a data center of a business or organization) or distributed (e.g., provided by various computing resources located at different locations, such as different data centers and/or located in different cities or countries).

The cloud computing services 1810 are utilized by various types of computing devices (e.g., client computing devices), such as computing devices 1820, 1822, and 1824. For example, the computing devices (e.g., 1820, 1822, and 1824) can be computers (e.g., desktop or laptop computers), mobile devices (e.g., tablet computers or smart phones), or other types of computing devices. For example, the computing devices (e.g., 1820, 1822, and 1824) can utilize the cloud computing services 1810 to perform computing operations (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 18, computer-readable storage media include memory 1720 and 1725, and storage 1740. The term computer-readable storage media does not include signals and carrier waves. In addition, the term computer-readable storage media does not include communication connections (e.g., 1770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more computer-readable storage media comprising:
    computer-executable instructions that, when executed by a computing system comprising a processor and a memory, the computing system implementing a source node in communication with a replica node, cause the computing system to receive from a database client a database operation;
    computer-executable instructions that, when executed by the computing system, cause the computing system to execute the database operation on the at least one database table at the source node;
    computer-executable instructions that, when executed by the computing system, cause the computing system to send the database operation to the replica node;
    computer-executable instructions that, when executed by the computing system, cause the computing system to receive a commit request for a transaction that comprises the database operation;
    computer-executable instructions that, when executed by the computing system, cause the computing system to, in response to receiving the commit request, assign a commit identifier to the transaction;
    computer-executable instructions that, when executed by the computing system, cause the computing system to, in response to the receiving the commit request, send a synchronous prepare commit request to the replica node, wherein, in response to receiving the synchronous prepare commit request from the source node, the replica node assigns a precommit identifier to the transaction, which marks the transaction as in doubt, wherein an in-doubt database transaction is a database transaction that has not been committed or aborted and the precommit identifier determines whether the transaction will be visible to a read operation;
    computer-executable instructions that, when executed by the computing system, cause the computing system to, in response to the receiving the commit request, after assigning the commit identifier to the transaction and after, or currently with, sending the synchronous prepare commit request to the replica node, and without waiting to receive a synchronous prepare commit acknowledgment from the replica node in response to the synchronous prepare commit request:
        initiate writing of a commit log entry for the transaction comprising the database operation to persistent storage, the commit log entry comprising the commit identifier, wherein the synchronous prepare commit request is sent to the replica node prior to finishing writing of the commit log; and
        wherein a time taken to complete a replication process is reduced by overlapping the writing of the commit log with the synchronous prepare commit request and the synchronous prepare commit acknowledgement;
    computer-executable instructions that, when executed by the computing system, cause the computing system to receive the synchronous prepare commit acknowledgment from the replica node, wherein the prepare commit acknowledgment indicates that the database operation was executed at the replica node; and
    computer-executable instructions that, when executed by the computing system, cause the computing system to, after receiving the synchronous prepare commit acknowledgement from the replica node, send a commit acknowledgement to the database client.

2. The one or more computer-readable storage media of claim 1, wherein the commit acknowledgement sent from the source node indicates that the transaction was committed by the source node and is sent without waiting to receive a commit acknowledgment from the replica node.

3. The one or more computer-readable storage media of claim 1, wherein the transaction comprises a query that reads a result of the database operation, the one or more computer-readable storage media further comprising:
    computer-executable instructions that, when executed by the computing system, cause the computing system to, before committing the transaction, execute the query at the source node.

4. The one or more computer-readable storage media of claim 1, wherein the transaction comprises a query that reads a result of the database operation, the one or more computer-readable storage media further comprising:
    computer-executable instructions that, when executed by the computing system, cause the computing system to, before committing the transaction, receive the query from the replica node; and
    computer-executable instructions that, when executed by the computing system, cause the computing system to, before committing the transaction, execute the query at the source node.

5. The one or more computer-readable storage media of claim 1, wherein the commit identifier comprises a timestamp for the commit of the transaction.

6. The one or more computer-readable storage media of claim 1, wherein the sending the database operation to the replica node is carried out asynchronously.

7. The one or more computer-readable storage media of claim 1, wherein the sending the database operation to the replica node is carried out synchronously.

8. The one or more computer-readable storage media of claim 1, wherein the transaction is a first transaction, further comprising:
    computer-executable instructions that, when executed by the computing system, cause the computing system to execute a second transaction on the source node that accesses results of the first transaction without waiting to receive the commit acknowledgment for the first transaction from the replica node.

9. A computer system that implements a source node, the source node in communication with a replica node, the computer system comprising:
 a processor;
 a memory coupled to the processor;
 one or more computer-readable storage media storing computer-executable instructions that, when executed, cause the computer system to perform operations comprising:
  receiving from a database client a database operation;
  executing the database operation on the at least one database table at the source node;
  sending the database operation to the replica node;
  receiving a commit request for a transaction that comprises the database operation;
  in response to receiving the commit request, assigning a commit identifier to the transaction;
  in response to the receiving the commit request, sending a synchronous prepare commit request to the replica node, wherein, in response to receiving the synchronous prepare commit request from the source node, the replica node assigns a precommit identifier to the transaction, which marks the transaction as in doubt, wherein an in-doubt database transaction is a database transaction that has not been committed or aborted and the precommit identifier determines whether the transaction will be visible to a read operation;
  in response to the receiving the commit request, after assigning the commit identifier to the transaction and after, or currently with, sending the synchronous prepare commit request to the replica node, and without waiting to receive a synchronous prepare commit acknowledgment from the replica node in response to the synchronous prepare commit request:
   initiating writing of a commit log entry for the transaction comprising the database operation to persistent storage, the commit log entry comprising the commit identifier, wherein the synchronous prepare commit request is sent to the replica node prior to finishing writing of the commit log; and
   wherein a time taken to complete a replication process is reduced by overlapping the writing of the commit log with the synchronous prepare commit request and the synchronous prepare commit acknowledgement;
  receiving the synchronous prepare commit acknowledgment from the replica node, wherein the prepare commit acknowledgment indicates that the database operation was executed at the replica node; and
  after receiving the synchronous prepare commit acknowledgement from the replica node, sending a commit acknowledgement to the database client.

10. The computer system of claim 9, wherein the commit acknowledgement is sent to the database client without waiting to receive a commit acknowledgment from the replica node.

11. The computer system of claim 9, wherein the transaction comprises a query that reads a result of the database operation, the operations further comprising:
 before committing the transaction, executing the query at the source node.

12. The computer system of claim 9, wherein the transaction comprises a query that reads a result of the database operation, the operations further comprising, before committing the transaction:
 receiving the query from the replica node; and
 executing the query at the source node.

13. The computer system of claim 9, wherein the transaction is a first transaction, the method further comprising executing a second transaction on the source node that accesses results of the first transaction without waiting to receive the commit acknowledgment for the first transaction from the replica node.

14. The computer system of claim 9, wherein the commit identifier comprises a timestamp for the commit of the transaction.

15. The computer system of claim 9, wherein the sending the database operation to the replica node is carried out asynchronously.

16. The computer system of claim 9, wherein the sending the database operation to the replica node is carried out synchronously.

17. A method, implemented by a replica node comprising a processing unit and memory that implements part of a database replication system, the replica node being in communication with a source node that stores at least one database table, the replica node storing a copy of the at least one database table, comprising:
 receiving, from a database client, a first query associated with a first database transaction;
 determining that the first query depends on a first database operation in the first database transaction;
 determining that the first database operation has not been executed by the replica node;
 by the replica node, delaying execution of the first query pending execution of the first database operation;
 by the replica node, determining that a time associated with the delaying execution exceeds a threshold;
 by the replica node, based on the determining that the time exceeds the threshold, forwarding the first query to the source node for execution by the source node;
 receiving the first database operation asynchronously from the source node;
 executing the first database operation at the replica node on the copy of the at least one database table;
 receiving a first synchronous notification from the source node to prepare to commit the first transaction;
 precommitting the first database transaction at the replica node, the precommitting marking the first database transaction as in-doubt at the replica node and assigning a first precommit ID value to the first database transaction, wherein an in-doubt database transaction is a database transaction that has not been committed or aborted and the first precommit ID value determines whether the first database transaction will be visible to a read operation;
 sending a first synchronous prepare commit acknowledgment to the source node, the first prepare commit acknowledgment indicating that the first database transaction was precommitted by the replica node;
 receiving, from the database client, a second query associated with a second database transaction;
 determining that the second query depends on a second database operation in the second database transaction;
 determining that the second database operation has not been executed by the replica node;
 based on the determining that the second database operation has not been executed by the replica node, holding the second query for execution by the replica node pending execution of the second database operation;
 receiving the second database operation asynchronously from the source node;

executing the second database operation at the replica node on the copy of the at least one database table;

in response to executing the second database operation at the replica node, executing the second query, wherein a delay associated with the holding does not exceed the threshold;

receiving a second synchronous notification from the source node to prepare to commit the second database transaction;

precommitting the second database transaction at the replica node, the precommitting marking the second database transaction as in-doubt at the replica node and assigning a second precommit ID value to the second database transaction, wherein an in-doubt database transaction is a database transaction that has not been committed or aborted and the second precommit ID value can be used to determine whether the second database transaction will be visible to a read operation; and sending a second synchronous prepare commit acknowledgment to the source node, the second prepare commit acknowledgment indicating that the second database transaction was precommitted by the replica node.

18. The method of claim 17, wherein the first transaction is marked as in doubt as part of the precommitting, the method further comprising:

receiving a commit notification from the source node; and committing the first database transaction at the replica node, wherein the first transaction is marked as committed.

19. The method of claim 18, further comprising sending a synchronous commit acknowledgment to the source node, the synchronous commit acknowledgment indicating that the first database transaction was committed by the replica node.

20. The method of claim 18, wherein the commit notification for the first database transaction is sent asynchronously by the source node.

21. The method of claim 17, wherein the transaction is a first transaction, the method further comprising:

executing a second transaction on the source node that accesses results of the first transaction without waiting to receive the commit acknowledgment for the first transaction from the replica node.

22. One or more computer-readable storage media comprising:

computer-executable instructions that, when executed by a computing system comprising a processor and a memory, the computing system implementing a replica node in communication with a source node, cause the computing system to receive, from a database client, a first query associated with a first database transaction;

computer-executable instructions that, when executed by the computing system, cause the computing system to determine that the first query depends on a first database operation in the first database transaction;

computer-executable instructions that, when executed by the computing system, cause the computing system to determine that the first database operation has not been executed by the replica node;

computer-executable instructions that, when executed by the computing system, cause the computing system to by the replica node, delay execution of the first query pending execution of the first database operation;

computer-executable instructions that, when executed by the computing system, cause the computing system to by the replica node, determine that a time associated with the delaying execution exceeds a threshold;

computer-executable instructions that, when executed by the computing system, cause the computing system to by the replica node, based on the determining that the time exceeds the threshold, forward the first query to the source node for execution by the source node;

computer-executable instructions that, when executed by the computing system, cause the computing system to receive the first database operation asynchronously from the source node;

computer-executable instructions that, when executed by the computing system, cause the computing system to execute the first database operation at the replica node on the copy of the at least one database table;

computer-executable instructions that, when executed by the computing system, cause the computing system to receive a first synchronous notification from the source node to prepare to commit the first transaction;

computer-executable instructions that, when executed by the computing system, cause the computing system to precommit the first database transaction at the replica node, the precommitting marking the first database transaction as in-doubt at the replica node and assigning a first precommit ID value to the first database transaction, wherein an in-doubt database transaction is a database transaction that has not been committed or aborted and the first precommit ID value determines whether the first database transaction will be visible to a read operation;

computer-executable instructions that, when executed by the computing system, cause the computing system to send a first synchronous prepare commit acknowledgment to the source node, the first prepare commit acknowledgment indicating that the first database transaction was precommitted by the replica node;

computer-executable instructions that, when executed by the computing system, cause the computing system to receive, from the database client, a second query associated with a second database transaction;

computer-executable instructions that, when executed by the computing system, cause the computing system to determine that the second query depends on a second database operation in the second database transaction;

computer-executable instructions that, when executed by the computing system, cause the computing system to determine that the second database operation has not been executed by the replica node;

computer-executable instructions that, when executed by the computing system, cause the computing system to, based on the determining that the second database operation has not been executed by the replica node, hold the second query for execution by the replica node pending execution of the second database operation;

computer-executable instructions that, when executed by the computing system, cause the computing system to receive the second database operation asynchronously from the source node;

computer-executable instructions that, when executed by the computing system, cause the computing system to execute the second database operation at the replica node on the copy of the at least one database table;

computer-executable instructions that, when executed by the computing system, cause the computing system to, in response to executing the second database operation at the replica node, execute the second query, wherein a delay associated with the holding does not exceed the threshold;

computer-executable instructions that, when executed by the computing system, cause the computing system to receive a second synchronous notification from the source node to prepare to commit the second database transaction;

computer-executable instructions that, when executed by the computing system, cause the computing system to precommit the second database transaction at the replica node, the precommitting marking the second database transaction as in-doubt at the replica node and assigning a second precommit ID value to the second database transaction, wherein an in-doubt database transaction is a database transaction that has not been committed or aborted and the second precommit ID value can be used to determine whether the second database transaction will be visible to a read operation; and computer-executable instructions that, when executed by the computing system, cause the computing system to send a second synchronous prepare commit acknowledgment to the source node, the second prepare commit acknowledgment indicating that the second database transaction was precommitted by the replica node.

23. The one or more computer-readable storage media of claim 22, wherein the first transaction is marked as in doubt as part of the precommitting, further comprising:

computer-executable instructions that, when executed by the computing system, cause the computing system to receive a commit notification from the source node; and computer-executable instructions that, when executed by the computing system, cause the computing system to commit the first database transaction at the replica node, wherein the first transaction is marked as committed.

24. The one or more computer-readable storage media of claim 23, further comprising:

computer-executable instructions that, when executed by the computing system, cause the computing system to send a synchronous commit acknowledgment to the source node, the synchronous commit acknowledgment indicating that the first database transaction was committed by the replica node.

25. The one or more computer-readable storage media of claim 23, wherein the commit notification for the first database transaction is sent asynchronously by the source node.

26. The one or more computer-readable storage media of claim 22, wherein the transaction is a first transaction, further comprising:

computer-executable instructions that, when executed by the computing system, cause the computing system to execute a second transaction on the source node that accesses results of the first transaction without waiting to receive the commit acknowledgment for the first transaction from the replica node.

* * * * *